April 30, 1963  F. P. FEHN  3,088,063
PRESS DRIVE CONTROL
Filed May 26, 1958  6 Sheets-Sheet 1
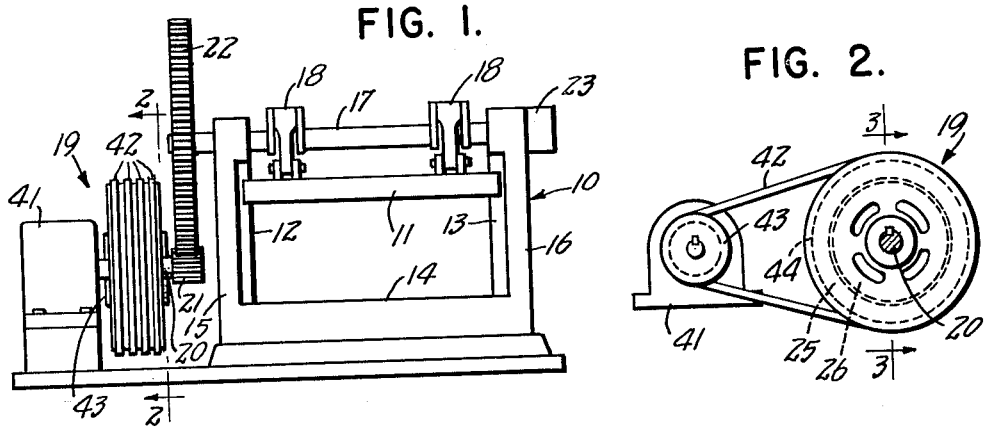
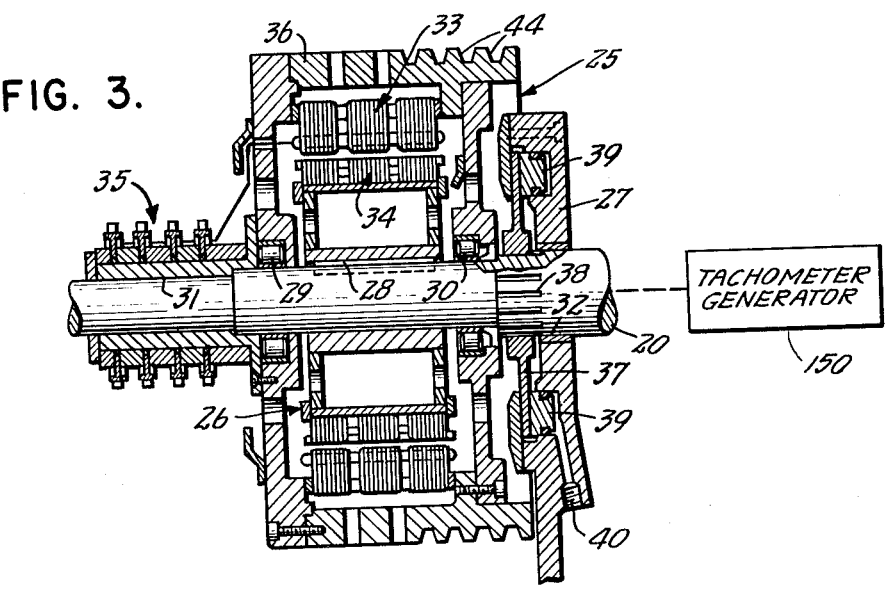
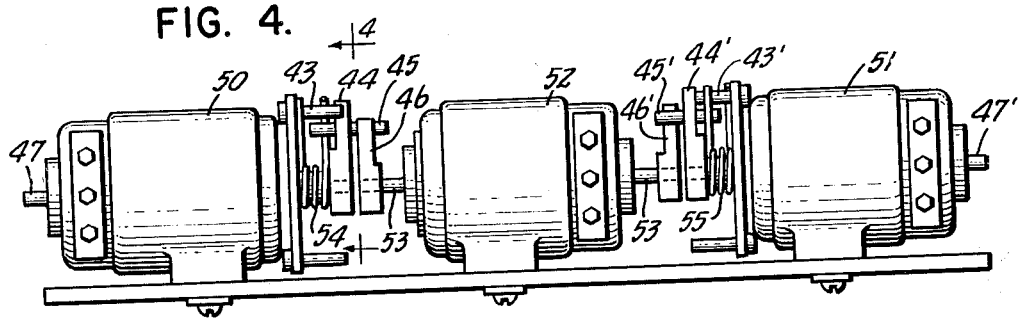
INVENTOR
FRANK P. FEHN
BY
Williams & Tilberry
ATTORNEYS April 30, 1963 F. P. FEHN 3,088,063
PRESS DRIVE CONTROL
Filed May 26, 1958 6 Sheets-Sheet 2

INVENTOR
FRANK P. FEHN
BY
Williams & Tilberry
ATTORNEYS

INVENTOR
FRANK P. FEHN
BY
Williams & Tilberry
ATTORNEYS

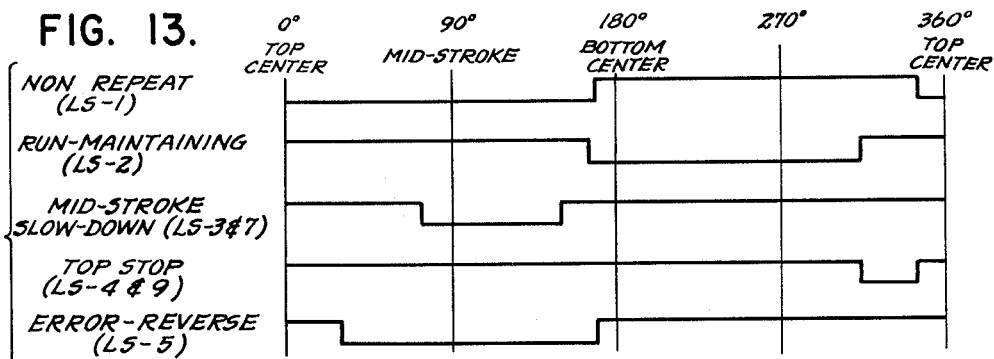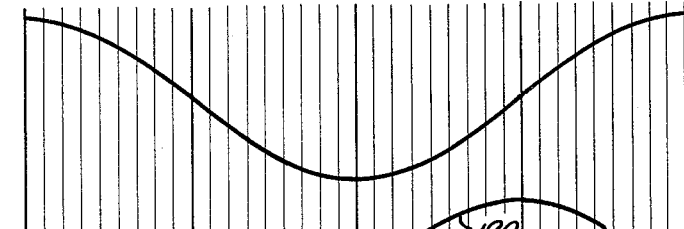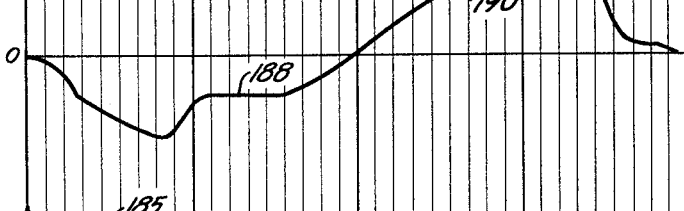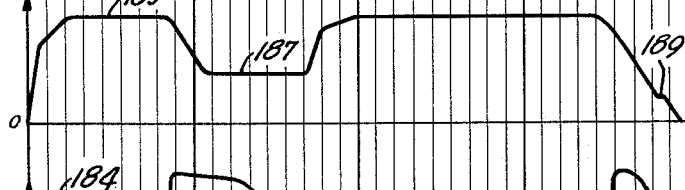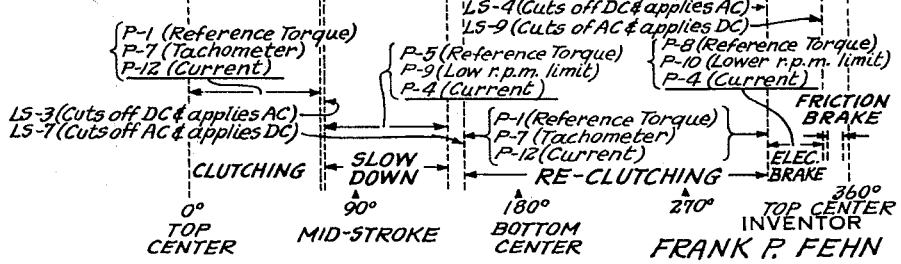

United States Patent Office 3,088,063
Patented Apr. 30, 1963

3,088,063
PRESS DRIVE CONTROL
Frank P. Fehn, Canton, Ohio, assignor to E. W. Bliss Company, Canton, Ohio, a corporation of Delaware
Filed May 26, 1958, Ser. No. 737,820
21 Claims. (Cl. 318—161)

This invention relates to a power-control circuit, and in particular to such circuits in which large quantities of power are to be governed with maximum flexibility and speed, as for supply to a prime mover or torque transmitter capable of delivering high transient torques. The control circuit is described in particular application to a heavy-duty power press. Torque transmitters of this general character are disclosed in greater detail in my copending application Serial No. 607,024, filed August 30, 1956 (now Patent No. 2,931,928), and in my copending patent application Ser. No. 640,273, filed February 14, 1957 (now Patent No. 2,941,137).

In the past, it has been the practice to drive a heavy-duty power press by continuously running a flywheel by electric motor means and by coupling the flywheel to the backshaft of the press. A clutching mechanism is employed when necessary to deliver transient high torque to the backshaft, and in order to kill press momentum (once developed) it has been the practice to disconnect the clutch and transiently apply a brake to the frame. Thus, both the basic drive mechanism and the basic brake mechanism involve reference to the frame. This mode of operation is basically inefficient and unnecessarily time consuming, and does not lend itself to a maximum of safety features.

It is, accordingly, an object of the invention to provide improved power-control circuits for apparatus of the character indicated.

It is another object to provide an improved and more efficient power press and control mechanism therefor.

It is also an object to provide an improved power-control circuit of the character indicated, permitting maximum flexibility of set-up for the performance of a wide range of possible control cycles.

In application to a power press, it is a specific object to provide an improved reverse-jog mechanism; and it is another specific object to provide an error-reverse control whereby the press slide may be quickly reversed and returned to top center, should the slide fail to go through bottom center or should there by any other inadvertent failure or accident prior to reaching bottom center.

It is a general object to achieve the above objects with control means providing the fastest possible machine response with minimum heat dissipation for any change of control function.

Other objects and various further features of novelty and invention will be pointed out or will occur to those skilled in the art from a reading of the following specification in conjunction with the accompanying drawings. In said drawings, which show, for illustrative purposes only, preferred forms of the invention:

FIG. 1 is a simplified view in longitudinal elevation of a power press to which a drive mechanism of my invention has been applied;

FIG. 2 is a side view of the basic drive mechanism for the machine of FIG. 1, as viewed from the plane 2—2 of FIG. 1;

FIG. 3 is an enlarged sectional view taken in the plane 3—3 of FIG. 2;

FIG. 4 is a view in elevation of an element of the control means for the device of FIG. 3;

FIG. 13 is a collection of diagrams depicting various program-switch cycles for elements of the circuits of FIGS. 11 and 12, as a function of the cycle of operation of the press of FIG. 1; and FIG. 14 is a diagram on the same scale as the cycles of FIG. 13 and depicting various important operating functions of the press of FIG. 1 in an illustrative controlled cycle of operation thereof.

Figure 5:
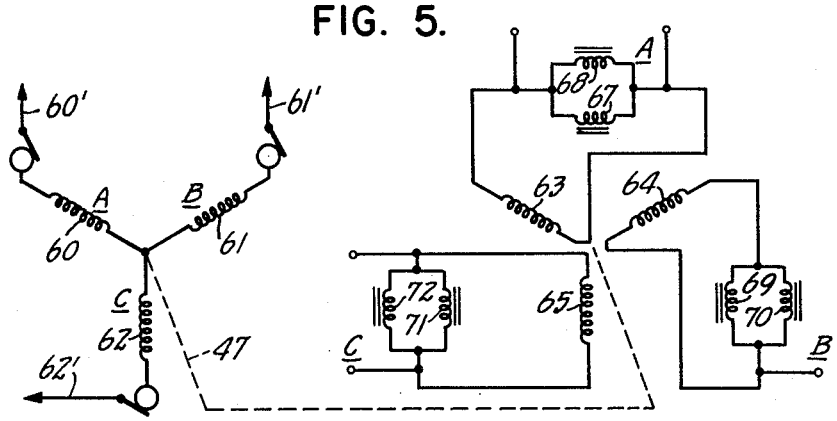
FIG. 5 is an electrical diagram illustrating the internal organization of a part of FIG. 3.

Briefly stated, my invention contemplates a power-press drive organization and associated control circuitry, whereby the magnitude and polarity of the coupling coefficient between the press and a continuously running fly-wheel may be variously controlled to achieve numerous functions, permitting a greater variety of press operations with increased safety and efficiency. As far as the electrical control system is concerned, this means that the "load" is the electrical reaction developed or encountered when changing or maintaining the coupling coefficient to change or maintain the torque delivered to or extracted from the press.

More specifically, my invention contemplates improved means whereby multiple-phase power may be controlled in its delivery to the above-indicated type of "load." For any particular electrical phase, the amount of power delivered in an electrical cycle is determined by the controlled fraction of the cycle during which the output circuit to the "load" is transiently completed. The specific means whereby this fraction of the cycle may be adjustably controlled is discussed in detail in said copending application, Serial No. 640,273, now Patent No. 2,941,137, but it may be said generally to require the supply of a selectively varied phase shift in order to produce corresponding variations in the amount of power delivered to the "load." To achieve this phase shift, a synchro-generator or control transformer is selectively angularly positioned by means of a servomechanism, employing a servomotor to directly drive the synchro-generator. The present invention is most particularly concerned with the circuitry for driving such a servomotor, in application to torque control in a power press.

In the specific application to be described, it is desired selectively to deliver controlled amounts of A.-C. and D.-C. power to a particular load, there being separate phase-shift-sensitive power-delivery circuits for both the A.-C. and D.-C. sides of the system. For this purpose, two separate synchro-generators are connected for direct drive by the same servomotor. A given direction and magnitude of angular positioning of the servomotor will determine how much of the A.-C. or D.-C. power is to be delivered to the load.

Referring to FIG. 1 of the drawings, my invention is shown in application to a power press 10 having a slide 11 to be vertically reciprocated in guide means 12—13 with respect to a bed 14. The guides 12—13 are formed in or carried by side uprights or pedestals 15—16, providing journalled support at their upper ends for an elongated crankshaft 17, having driving connection to the slide 11; rods 18 are shown connecting the crankshaft to the slide 11 at spaced locations, and the parts are shown in the top-center position. Drive to the crankshaft is derived from prime-mover mechanism 19 of the invention and is delivered directly to the backshaft 20 of the press; a pinion 21 on the backshaft 20 is shown meshing with a drive gear 22 on the crankshaft 17. Although not specifically shown, it will be understood that the backshaft 20 may extend the full length of the machine, and that another pinion and drive gear mechanism may be employed at the opposite end (right-hand end, in the sense of FIG. 1) of the machine, so that both ends of the crankshaft 17 are driven in unison, and the crankshaft 17 is subjected to minimum torsional deflection. This additional mechanism is, however, omitted in the present diagram for purposes of simplicity, and at the said opposite end (right-hand end) I simply designate at 23 that program means of conventional configuration may be driven by the crankshaft 17 so as to operate a plurality of switches in a given sequence throughout a particular cycle of the crankshaft 17.

The basic prime-mover elements are described in greater detail in my said application Serial No. 607,024, now Patent No. 2,931,928, but in connection with FIGS. 2 and 3 it suffices to say that the prime mover comprises coacting electrically excited elements carried by each of two relatively rotatable members 25—26, both of which are mounted for rotation with respect to frame means 27 and about the same axis which, for present purposes, may be identified as the output or backshaft 20. The inner rotatable member 26 is shown keyed at 28 to the shaft 20, and the outer rotatable member or flywheel 25 is shown mounted on spaced antifriction bearings 29—30 on the shaft 20. The shaft is journalled in bearings 31—32 in the frame 27.

As indicated generally above, coacting electrically excited elements are carried by each of the relatively rotatable members 25—26. In the form shown, these elements comprise field-winding means and laminations 33 carried by the outer rotatable member 25, and armature laminations and winding means 34 carried by the inner rotatable member 26. The inner and outer winding means may be of any variety to develop rotational torque between the two members 25—26, and electrical connections may be made by way of slip-rings and/or commutator means, designated generally 35, as is common practice. By this I mean that the elements 33—34 may constitute parts of an otherwise conventional D.-C. or A.-C. motor. However, in the drawings, I indicate schematically the employment of a three-phase induction-motor construction in which the elements 34 on the inner rotational member 26 are of the squirrel-cage variety, three-phase excitation being applied to the winding of the outer element 33. Since the outer rotational member 25 is to constitute the flywheel from which rotational energy is to be transiently extracted, I show the formation of member 25 with very substantial moment of inertia about the rotational axis as by provision of a large annular mass 36 at maximum radius of the member 25. In stating that the moment of inertia of the member 25 is substantial, I of course mean that it is substantial in relation to the moment of inertia of the inner rotational member 26, and also that it is substantial compared to the reflected moment of inertia of the entire press structure, it being appreciated that the mechanical advantage from the backshaft 20 to the slide 11 is relatively great by reason of the gear train 21—22, and because the crankshaft is positioned at top center (as shown) when torque is initially applied to drive the slide 11.

To complete the general organization of FIG. 3, means are provided for establishing a braking reference for the shaft 20 (or inner rotational element 26) to the frame. For this purpose, I show a friction-brake plate 37 fitted to a spline 38, and I provide piston or brake-shoe means 39 for coaction therewith, to arrest the shaft 20 and inner rotational element 26 whenever necessary. It will be understood that the friction brake may be of the "fail-safe" variety in which a spring normally loads piston 39 for engagement with plate 37, the piston being relieved from such engagement by fluid-pressure means; however, for simplicity in the drawings, fluid-pressure actuation is direct on piston 39 in the direction of engagement with plate 37, pressure fluid being supplied at 40.

As explained in said Patent No. 2,931,928, energy stored in the rotating flywheel or outer member 25 may be sufficient to drive the load, such as the press of FIG. 1, for the normal transient demands of such load. However, in some cases, an additional energy source is desirable, and I suggest in FIG. 2, the employment of a relatively small continuously running electric motor 41 for this purpose. The motor 41 may be connected to the outer rotational element 25 by a belt drive 42 running from the motor-drive pulley 43, and engaging suitable grooves 44 in the periphery of the outer rotational member 25.

As explained in said copending applications, the elements 33—34 may be excited not only as motor elements to develop rotational torque between members 25—26 but may also be excited to develop locking or non-rotationable torque between members 25—26. In a typical cycle of operation, the brake means 37—39 is first set and the elements 33—34 excited (as by three-phase alternating current) to develop rotational torque. This drives the flywheel member 25 with respect to the frame 27 until the desired amount of angular momentum has been imparted to the flywheel element, at which point the A.-C. excitation may be cut off or substantially reduced. The brake reference at 37—39 is then released, and the kinetic energy of the rotating flywheel 25 is available for transient application to the load, namely, the press of FIG. 1. To clutch the flywheel to the load, the elements 33—34 are differently excited, as by direct current, to develop locking torque so that the inner rotational member 26 (which, for convenience herein, may sometimes be referred to as the rotor) becomes locked to the outer rotational element 25 (which, for convenience herein, may sometimes be referred to as the stator, even though it is rotated as long as the device is in use), and flywheel energy is directly imparted to the load.

The transient transfer of flywheel energy to the load will be accompanied by some reduction in flywheel speed, and in order to restore this energy, and at the same time to arrest rotation of the rotor 26, the elements 33—34 are again excited to produce rotational torque. When the rotor 26 is thus brought back to substantially zero speed with reference to the frame, automatic speed-responsive means (to be later described) re-applies the brake 37—39 so that if by then the flywheel 25 has not been brought up to the desired speed, the remaining speed may be developed by torque reaction against the frame without further displacing the output shaft 20. Of course, as indicated generally above, for short cycle periods in which unusually great amounts of energy are extracted, it may be desirable to employ the additional small motor 41 for the necessary restoration of angular momentum in the flywheel element 25.

Reviewing the above discussion, it may be said that when the particular device of FIG. 3 is excited with direct current, meaning that the rotor and stator (flywheel) are brought to locking relation, and torque is delivered to the load, we have a clutching operation characterized by the development of positive torque as far as the output shaft 20 is concerned. Similarly, when the device is excited with alternating current to produce rotational torque between members 25—26, a braking function is developed in the output shaft 20, so that as far as the output shaft 20 is concerned, *negative torque* is being delivered. Throughout the present description and for purposes of more simplified description, clutching and braking action on the one hand, and positive and negative torque on the other hand, will be understood as having the meanings indicated, although a more generalized discussion appears at the close of this specification.

WINDING EXCITATION CONTROL

As indicated generally above, the device of FIG. 3, and in particular the winding or coacting winding elements 33—34 operate from a three-phase source of voltage, and phase shifting is employed as an important element of the control, whether the control is effected during the A.-C. excitation or D.-C. excitation phases of operation of the machine. In FIG. 4, I show a particular mechanical organization of clutch and brake synchro generators 50—51 and servomotor 52 which I have found to be eminently satisfactory to develop such phase shifting. The motor 52 may be of the so-called reversible stalled-torque variety, meaning that it may be excited to deliver selected positive and negative torques while stalled. With torque of one polarity, the motor shaft 53 drives (i.e. angularly shifts) the clutch synchro-generator 50, and with torque of opposite polarity the motor shaft 53 drives (i.e. angularly shifts) the brake synchro-generator 51. In the form shown, springs 54—55 serve to reposition both synchro-generators 50—51 to a neutral or mid-position, in which no phase shift is produced in either one of the generators 50—51. Preferably, the couplings of shaft 53 to the generators 50—51 incorporate a lost motion in each case, so that whenever shaft 53 is effective to rotate the synchro 50 (one direction away from the mid-position) it is ineffective to rotate the synchro 51. By the same token, rotation of the synchro 51 (in the other direction away from the mid-position) involves no rotation of synchro 50.

The zero phase-shift position for synchro 50 may be determined by a stop pin 43, fixed to the frame of synchro 50 and determining the limit to which the spring 54 can urge an arm 44 on the shaft of the synchro-generator 50. The arm 44 supports an elongated pin 45 which may be intercepted by the drive arm 46 carried by the motor shaft 53. Thus, whenever the clutch synchro-generator 50 is to be rotated by motor 52, arm 46 will engage pin 45 to relieve arm 44 from the stop 43. The more the motor-driven displacement of arm 44 (clockwise in the sense viewed from aspect 4—4 of FIG. 4), the more the opposing torque developed by spring 54, and a given phase shift occasioned by rotation of the synchro-generator 50 will be achieved when the instantaneous torque developed by motor 52 equals the opposing torque developed by spring 54. Of course, when the motor 52 is de-energized, spring 54 returns the synchro-generator 50 to the zero phase-shift position.

In a similar manner, and for positions of shaft 53 on the opposite angular side of the reference position determined by spring return to the stop pin 43, the shaft 53 serves to adjustably determine phase shift in the brake synchro-generator 51. The parts which actuate generator 51 are analogous to those described for generator 50, and have therefore been given the same reference numerals with prime notation. Thus, a given braking excitation will be determined by the amount of phase shift (and therefore the extent of rotation) of the braking synchro-generator 51.

The diagram of FIG. 5 illustrates the internal organization of one of the synchro-generators 50—51, and since particular emphasis herein is on clutching, the diagram of FIG. 5 may be viewed as illustrating the windings of the "clutching" synchro-generator 50. Synchro-generator 50 comprises a rotor having three-phase windings 60—61—62 supplied by slip rings connected at 60'—61'—62' to a three-phase source; the windings 60—61—62 happen to be shown Y-connected. For convenience in the present description, the phase of excitation of the winding 60 will be termed the A-phase, the phase at winding 61 will be termed the B-phase, and the phase at winding 62 will be termed the C-phase.

Stator or secondary windings 63—64—65 of generator 50 have orientation corresponding to the primary or rotor windings 60—61—62, but are disconnected so that no Y-connection is provided. By disconnecting the secondary or stationary windings 63—64—65, the voltages induced therein can be kept as independent as possible, thereby materially reducing the extent to which transient voltages in one phase are induced in another phase, and totally eliminating circulating transients in the secondary phases.

The output voltages of the synchro generator or control transformer 50 incorporate selected phase shifts, reflecting the instantaneous angular displacement of the generator rotor shaft 47 with respect to the stator; for the secondary winding 63, the selectively shifted A-phase voltage is externally available by means of one or more transformer coupling elements 67—68, the secondaries or output circuits of transformers 67—68 being omitted in FIG. 5. In a similar manner, separate phase-shifted voltages for the B-phase (secondary winding 64) are available at transformer outputs 69—70, and separate phase-shifted voltages for the C-phase (winding 65) are available at transformer outputs 71—72. At any one instant, i.e., for any given shaft displacement for the synchro generator of FIG. 5, the same phase shift will have been developed in the A, B, and C phases at outputs 67—68, 69—70, and 71—72, respectively.

Figure 6:
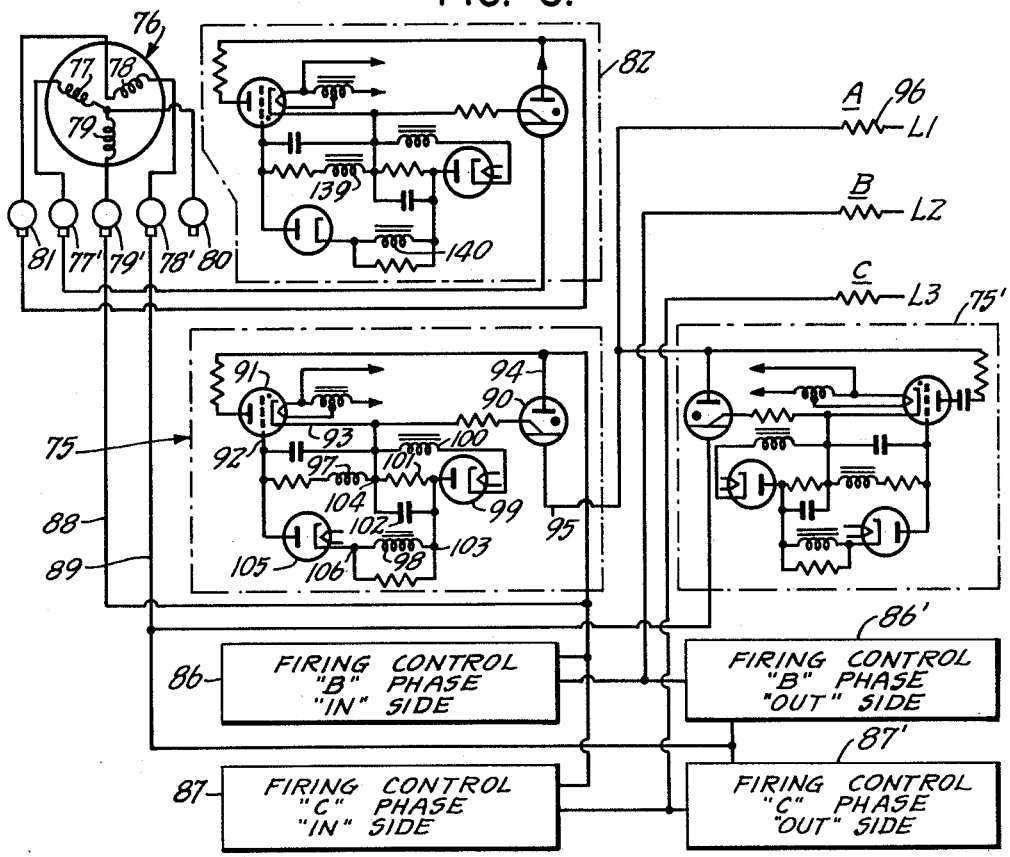
FIG. 6 is an electrical diagram illustrating a basic power-control circuit of the invention applied to the control of one general type of operation of the device of FIG. 3 and utilizing a part of the control element of FIG. 4.

My basic power-delivery or control circuit is illustrated in detail at 75 in FIG. 6, and the overall layout of FIG. 6 illustrates utilization of similar circuits (i.e. like circuit 75) in multiple for controlling power delivered to the load 76 to effect clutching action, meaning development of positive torque in the output shaft 20. The showing of load 76 in FIG. 6 will be understood to schematically represent electrical parts of the device of FIG. 3, there being shown three separate windings 77—78—79, which, for the development of motoring torque and braking action are Y-connected and excited by three-phase voltages (as described in connection with FIG. 7), but which, for the clutching action (D.-C. excitation) achieved with the circuit of FIG. 6, are connected in series.

In the form shown, separate slip-rings 77'—78'—79' provide independent connections to corresponding ends of windings 77—78—79. The other ends of windings 77—79 are shown interconnected, and this point of connection is brought out to a slip ring 80 which is utilized only for the development of braking or motoring action, to be described in connection with FIG. 7. The remaining slip-ring 81 is connected to the inner end of the remaining winding 78. As indicated, and for development of clutching action, the windings 77—78—79 are connected in series and are excited by D.-C. voltages. The series connection is assured by operation of a relay circuit 82 generally resembling the basic circuit 75. The relay circuit 82 is operated only to complete the series connection of windings 77—78—79 (i.e. only when clutching torque is called for), and is discussed following description of control circuit 75.

As indicated generally above, the basic control circuit 75 is provided in multiple, the multiple circuits being interconnected to apply controlled quantities of "full-wave" rectified power to load 76. The detailed showing of circuit 75 happens to be for the component which serves what may be termed the "In" side of the A-phase; a similar control circuit 75' serves the "Out" side of the A-phase. Similarly, control circuits 86—86' serve the "In" and "Out" sides of the B-phase, and control circuits 87—87' serve the "In" and "Out" sides of the C-phase. The interconnection of circuits 75—75', 86—86', 87—87' is such as to develop D.-C. voltages in the lines 88—89 of supply (at 79'—78') to the series-connected windings of the load 76.

I term my basic circuit 75 a firing-control circuit largely because in my use of the invention, the prime element 90 relied upon for delivery of power to the load has been a pool-type mercury-vapor gaseous-discharge device or ignitron; basically, however, the circuit 75 is merely a relay which may be transiently closed and opened for adjustably varied fractions of the electrical cycle of the particular phase with which it is concerned. The control circuit for the ignitron 90 is shown to be actuated by another gaseous discharge device, such as a thyratron 91, in such manner that when the thyratron 91 is fired, so also is the ignitron 90. Considered together, the control devices 90—91 may thus be viewed as having an input circuit (defined between the thyratron-grid connection 92 and the thyratron-cathode connection 93) and an output circuit (defined between the ignitron-anode connection 94 and the ignitron-pool connection 95).

As indicated, the control circuit 75 (FIG. 6) happens to be concerned with the "In" side of the A-phase, and for purposes of this description, this may be termed the reference phase for circuit 75, the pool 95 being connected to the A-phase supply line 96, and the anode 94 being connected to the load line 88. Basic control voltage for the input control circuit 92—93 is developed by a non-linear summation of voltage from the reference phase (phase A) and of voltage from the leading phase (phase C). Both of these control voltages are inverted with reference to the line phase. The inverted reference-phase (phase A) voltage is developed at winding 97, and the inverted leading-phase (phase C) voltage is developed at winding 98.

As explained in said Patent No. 2,941,137, the leading-phase voltage is preferably added to the control-circuit voltage only at such times as reference-phase voltage (winding 97) shall exceed negatively biased leading-phase voltage (winding 98). In the form shown, constant negative bias (i.e. terminal 103 of winding 98 biased negatively with respect to terminal 104 of winding 97) is developed by rectifier means 99 operating from a transformer secondary winding 100, which may be taken off any phase of the supply; smoothing elements 101—102 assure development of a steady bias voltage. In order that the biased leading-phase voltage may be added to the reference-phase voltage only when the reference-phase voltage exceeds the biased leading-phase voltage, I provide a non-linear element, such as a rectifier or diode 105 between the other terminal 106 of the leading-phase winding 98, and the thyratron-grid connection 92.

Reference-phase voltage supplied at 97 is an adjustably phase-shifted voltage which, for the clutching function is developed by synchro generator 50. Winding 97 may thus be the secondary of the output transformer whose primary 67 has been identified in FIG. 5.

As also indicated in said Patent No. 2,941,137, the described organization lends itself to alternative operations, according to one of which, the leading-phase voltage at 98 is not phase-shifted, whereas in the other alternative organization, it is phase-shifted. If it is not phase-shifted, the winding 98 may be viewed as the secondary of a transformer, the primary of which is directly connected to the C-phase of the line, as, for example, across the winding 62 in FIG. 5. If, on the other hand, the leading-phase voltage at 98 is adjustably phase-shifted, the winding 98 may be viewed as the secondary of the output transformer 72 connected across the C-phase of the stator shown in FIG. 5.

The circuit 75 is shown to include further resistance-capacitance elements, which serve primarily the function of smoothing certain voltage forms in eliminating undesirable transient effects, but essentially, the circuit 75 comprises the means whereby the reference-phase voltage (at 97) may be vectorially summed with the negatively biased leading-phase voltage (measured between terminals 104—106), whenever the reference-phase voltage exceeds in magnitude the negatively biased leading-phase voltage. This summation is diagrammatically represented and discussed at great length in said Patent No. 2,941,137, for both the alternative situations mentioned above. Furthermore, in my copending application Serial No. 666,074, filed June 17, 1957 (now Patent No. 2,912,606), a still further organization and operation of generally the same kind of circuit is described, the important point to note being that in every case, a phase-shifted voltage developed by a synchro generator as at 51 or 52, is utilized in the primary control of the ultimate torque-transmitter excitation circuits 33—34 (windings 77—78—79).

Figure 8:
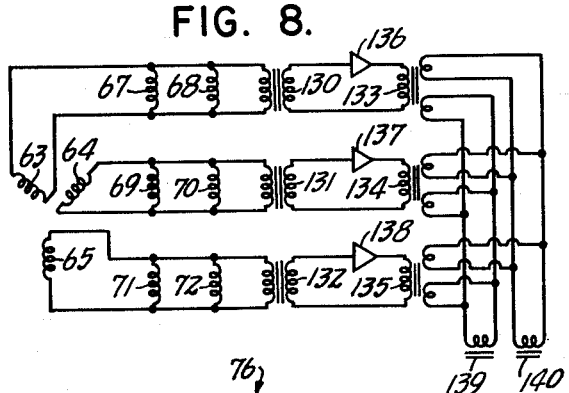
FIG. 8 is a diagram illustrating control components for the ignitron relay of FIG. 6.

It has been indicated that the function of the ignitron-relay circuit 82 is to establish load-winding connections appropriate for clutching action (D.-C. excitation). The components of circuit 82 will be recognized as resembling those of circuit 75, a few constants being different from those of circuit 75, in order to assure firing of circuit 82 no matter what the extent of firing in circuits 75—75', 86—86', and 87—87'. For purposes of FIG. 6, it suffices if relay 82 is continuously operative (to series-connect windings 77—78—79) and to this end, I have obtained satisfactory performance with the control circuit of FIG. 8, in which basic control voltages are shown derived from the phase-shifted secondaries 63—64—65 of the clutch synchro generator 50. In the form shown, additional transformers 130—131—132 across the secondary windings supply further transformers 133—134—135 through isolation amplifiers 136—137—138. First corresponding secondaries of transformers 133—134—135 are connected in parallel to supply the phase-shifted "In-phase" component transformer 139 of circuit 82, and second corresponding secondaries are also connected in parallel to supply the phase-shifted "Lead-phase" component transformer 140 of circuit 82. It will be seen that once the control circuits 75—75', 86—86', 87—87' of FIG. 6 have begun to conduct, voltage will be applied across the thyratron and ignitron of circuit 82, and that the phase-shifted voltage at 139—140 will enable circuit 82 to "fire" and to remain continuously "fired" (closed) until the control circuits (such as 75) are adjusted back to zero phase shift (i.e. shut off), it being understood that D.-C. magnetization of the load 77—78—79 between pulsed excitations thereof is sufficient to maintain circuit 82 continuously closed as long as the control circuits of FIG. 6 are supplying clutching energy.

Figure 7:
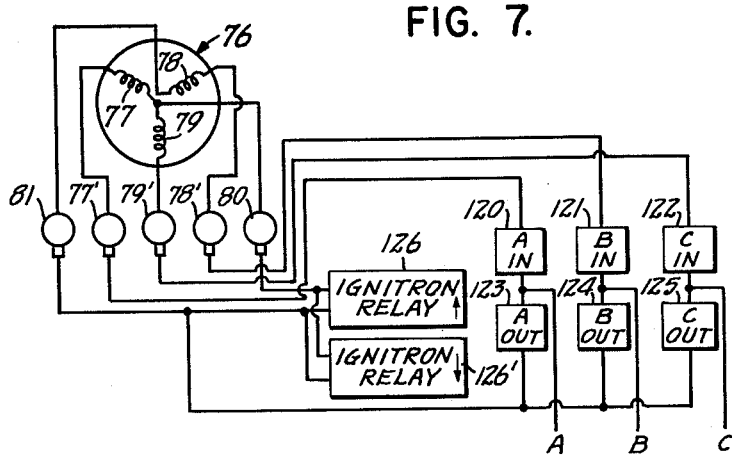
FIG. 7 is a simplified diagram along the lines of FIG. 6, but illustrating another general type of control, employing the same basic control circuit as shown in FIG. 6 and utilizing another part of the control element of FIG. 4 to determine another operation of the device of FIG. 3.

As indicated generally above, the circuit of FIG. 6 is concerned primarily with firing-control operations governing clutching action, that is, action in which direct current developed by the rectifying action of firing-control circuits 75—75'—86—86'—87—87' is supplied to the windings of the load in series, thus tending to lock the rotor and stator parts 25—26, with accompanying positive output torque development. The arrangement of FIG. 7 illustrates the other basic type of operation available with the control means of FIGS. 4 and 5, namely, motoring action, that is, action in which rotational torque is developed between the relatively rotating parts, with accompanying negative output torque development. The circuit of FIG. 7 includes a number of firing-control circuits 120—121—122—123—124—125, each of which may be completely similar and analogous to the circuit 75 described in detail in connection with FIG. 6. However, the interconnection of the circuits 120 . . . 125 and their manner of connection to the slip rings 77'—78'—79' is such as to achieve three-phase or motoring excitation of the windings 77—78—79 of the load, whenever the braking synchro generator 51 is partially rotated. The only change in connection necessary to achieve Y-connected load windings in FIG. 7 is to break the ignitron-relay connection established at 82 (between slip rings 81—77') in FIG. 6 and to establish in its place (through oppositely polarized ignitron relays 126—126') a connection between the slip rings 80—81. The ignition relay circuit 126—126' functions analogously to the relay circuit 82, but only when the servomotor 52 is driven in the direction calling for brake action, and the interconnection of slip rings 80—81 is maintained as long as any degree of brake action is still being called for. Since each ignitron relay is unidirectionally conductive, two oppositely polarized relays 126—126' are required to accommodate the full A.-C. pulsed voltages supplied to the load 76 by circuits 120 . . . 125.

Figure 9:
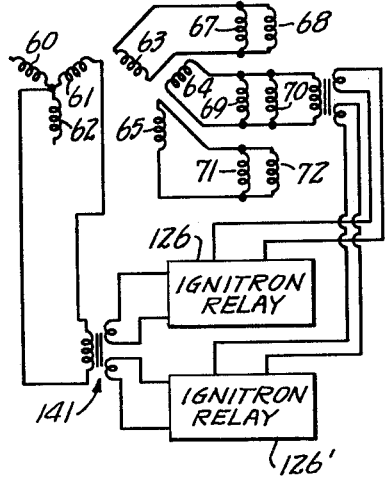
FIG. 9 is a diagram similar to FIG. 8, but illustrating control components for the ignitron relay of FIG. 7.

As indicated generally above, the function of relays 126—126' is to complete the connection of windings 77—78—79 for three-phase or A.-C. excitation. Since the A and C-phase windings 77—79 are always interconnected, it remains only for the B-phase winding 78 to be connected while B-phase voltages are applied (i.e. from control circuits 121—124); further, and in order to reduce inter-phase transients, I prefer that the polarized connections established by ignitron relays 126—126' be transiently made and broken only as necessary to accommodate the power pulses developed from the intermediate or B-phase control circuits 121–124. Suitable control connections for relays 126-126' are shown in FIG. 9, wherein phase-shifted B-phase voltage from the winding 64 of synchro generator 51 is developed for separate application to the "In-phase" windings of relays 126—126', it being understood that said "In-phase" windings correspond to the winding 139 of ignitron relay 82 (see FIG. 6) for clutching operations. In place of the "Lead-phase voltage" (as applied in FIG. 6 at windings 140 of relays 126—126'), I show preference in FIG. 9 for direct dependence on the unshifted or line voltage of the intermediate or B-phase, this connection being shown at transformer 141 in FIG. 9 across the B-phase primary winding 61. With properly selected circuit constants at 126—126', the center connection of winding 78 to windings 77—79 is "gated" to accommodate the power pulses to control circuits 121—124, the "gate" being enlarged as necessary to accommodate various pulse durations, inasmuch as the control circuits 121—124 and the ignitron relays 126—126' both operate from the same phase-shifting means 51. The directional arrows for relays 126—126' in FIG. 7 suggest the oppositely polarized functioning of these relays, as will be understood.

It will be seen that upon occurrence of any control signal calling for brake action (or negative output torque development), the circuit of FIG. 7 will be called into play to the exclusion of the circuit of FIG. 6, and that the motoring torque which produces brake action will be more or less in direct proportion to the position or displacement effected in the rotor of the brake synchro generator. Feed-back signals are developed (by means to be described) from the output of the tachometer generator, and serve to diminish the strength of motoring action (i.e. to reduce motoring torque) as the desired flywheel speed is developed in element 25.

Figure 10:
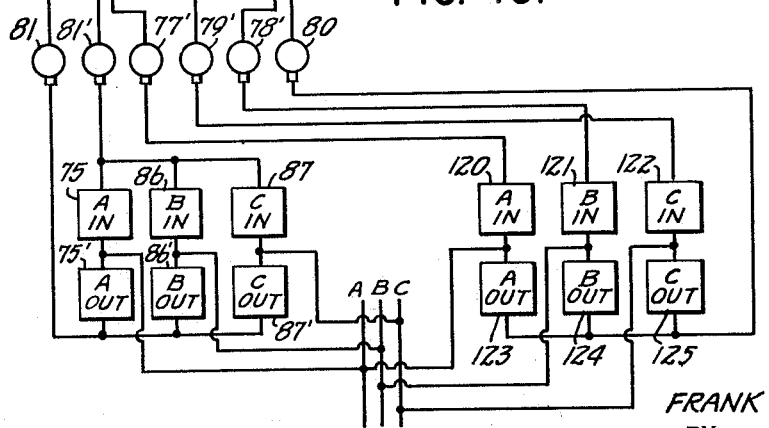
FIG. 10 is a diagram similar to FIGS. 6 and 7, but illustrating modified connections to the load.

In the discussion thus far, it has been stated that the same load windings are excited one way (with D.-C.) for "clutching" action, and another way (with A.-C.) for "braking" action. In some cases, it is convenient to provide separate A.-C. and D.-C. windings on the same rotatable elements 25—26, thus simplifying control connections, at least to the extent of eliminating the need for the ignitron relays 82—126—126'. Such a circuit is shown in FIG. 10, wherein the windings 77—78—79 are permanently interconnected for A.-C. excitation, and the separate winding 142 is permanently connected for D.-C. excitation. The control circuits 75—75'—86—86'—87—87' and 120—120'—121—121'—122—122' will be recognized from FIGS. 6 and 7 and therefore need not be further described, it being understood that for "clutching" action synchro generator 50 will be actuated so as to excite winding 142 directly through control circuits 75—75'—86—86'—87—87', and for that "braking" action, synchro generator 51 will be actuated so as to excite windings 77—78—79 directly through control circuits 120—120'—121—121'—122—122'.

PRESS CONTROL CIRCUITS

Figure 11:
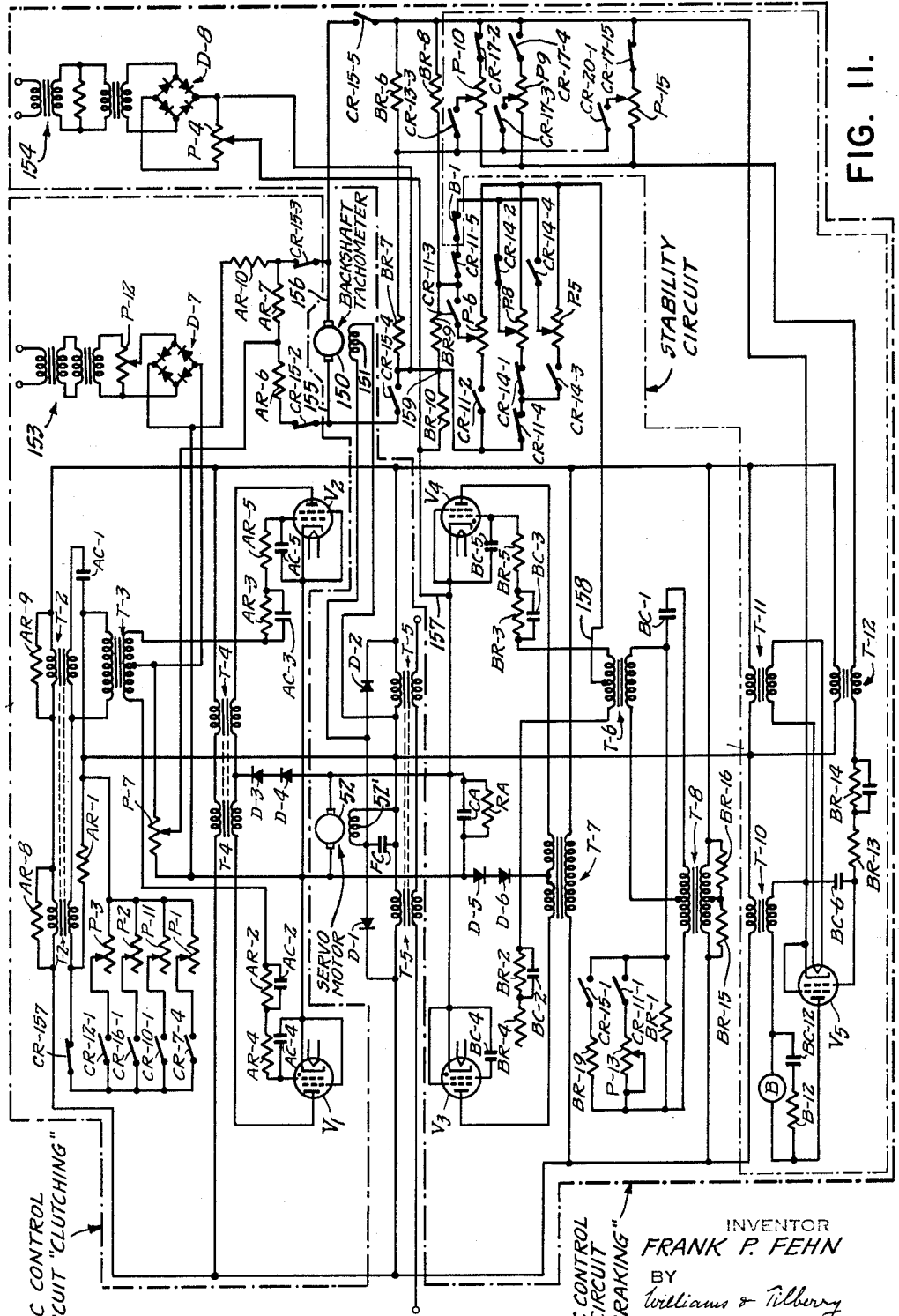
FIG. 11 is an electrical circuit diagram illustrating control circuits for the central or servomotor unit of FIG. 4.
Figure 12:
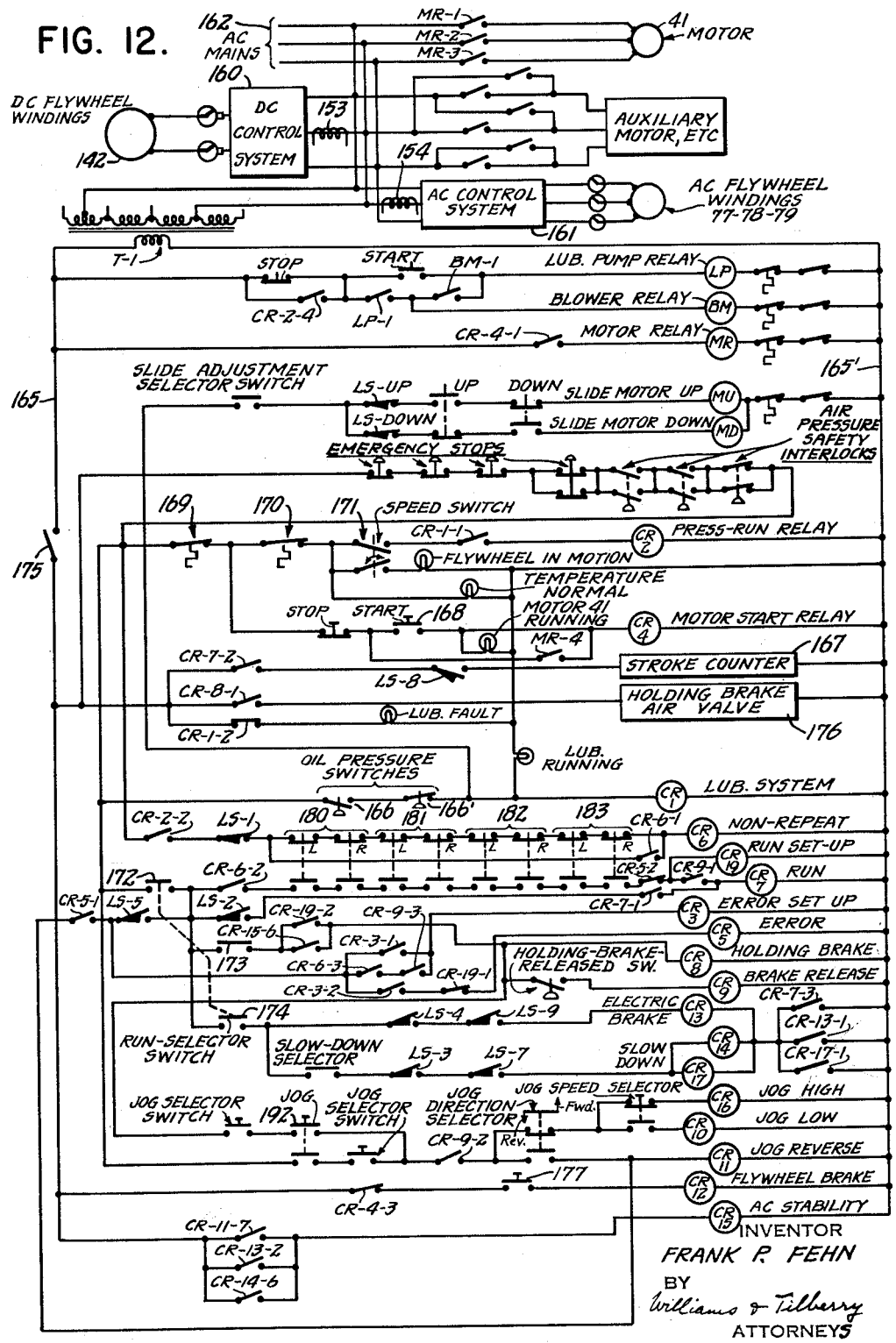
FIG. 12 is an electrical circuit diagram illustrating relay and switch connections for specific application to the power press of FIG. 1, and serving to cooperate with various elements of the control circuit of FIG. 11.

In FIGS. 11 and 12, I illustrate specific application of my invention to the control of a heavy-duty power press, as indicated schematically in FIG. 1. The switching circuits to the various relays, all specific to particular press operations, are shown in the control-circuit diagram of FIG. 12; and FIG. 11 not only illustrates a generalized form of circuit for driving the servomotor 52 and thus determining whether positive or negative output torque is developed, but also illustrates the specific connection of the control relay contacts of the circuit of FIG. 12 to this generalized control circuit.

Because of the numerous elements and connections in the two circuits, a special convention has been adopted for identifying circuit components. According to this convention, all control relays are designated "CR," with an identifying number. The first identifying number is characteristic of or unique to that particular relay, and the second identifying number identifies the particular set of contacts governed by operation of the relay. In all cases, the contacts are shown in their normal condition, that is, without the relay having been actuated. Thus, for example, the designation CR–7–4 will be understood to mean the fourth contact of control relay 7. Similarly, all manual switches are identified by the designation SW, all limit switches by the designation LS, potentiometers by the designation P, transformers by the designation T, rectifiers or detectors by the designation D, tubes by the designation V, and resistors and capacitors by the designations R and C, respectively.

It so happens that in the circuit of FIG. 11, many components within the segment of the circuit outlined in phantom and labeled "D.-C. Control Circuit, 'Clutching'" find their counterparts in the similarly outlined circuit labeled "A.-C. Control Circuit, 'Braking.'" Therefore, for simplicity, certain elements in the D.-C. circuit have a characteristic identifying letter "A," and corresponding elements in the A.-C. control circuit have a similar characteristic identifying letter "B." Thus, resistors in the D.-C. control circuit are identified "AR" and capacitors "AC," whereas in the A.-C. control circuit, similar resistors and capacitors are identified "BR" and "BC."

As indicated generally above, the extent to which servomotor 52 is driven for any particular desired control operation and also the direction in which it is driven are governed by the magnitude and sense of torque development, that is, excitation signal applied to the servomotor 52. For positive output-torque development to the back-shaft 20, the D.-C. control circuit of FIG. 11 will be operative to excite the servomotor 52. In the form shown, the circuit for developing such excitation includes a pair of thyratrons $V_1$–$V_2$ operated in push-pull, in accordance with the extent of phase shift between the grid circuits thereof with respect to their output or plate circuits. Plate-circuit excitation for tubes $V_1$–$V_2$ is available from transformer T–4 which, in turn, derives its basic line excitation from transformer T–5; and the varying degrees of phase shift for potentials applied to the grid circuits of these tubes are developed from a basic control voltage, picked off a further transformer T–2 and processed in simple RC (resistance-capacitance) phase-shifting means. A coupling transformer T–3 connects the output of the phase-shift circuit AC–1, AR–1 to the control-grid or input circuits of thyratrons $V_1$–$V_2$.

In the form shown, the capacitor AC–1 and the resistor AR–1 are the basic phase-shifting elements in the input or control circuits of $V_1$–$V_2$, and by inserting various different shunt resistances at potentiometers P–1, P–2, P–3, P–11 (being all across phase-shifting resistor AR–1), different magnitudes of control-voltage output are developed at tubes $V_1$–$V_2$ for application to the servomotor 52, it being noted that the polarity of all such voltage output levels for driving the servomotor 52 is the same, i.e., such as to produce positive output-torque development. Voltage for the field winding 52' of the servomotor 52 may be developed directly across the secondary transformer T-5 and is shown rectified at D-1, D-2, the rectified voltage being smoothed by filter means FC.

The desired polarity of excitation of servomotor 52 for any "clutching" action (or positive output-torque development) is assured by rectifying the output of tubes $V_1-V_2$, as by using diode elements D-3, D-4 having a polarity connection which is unique to "clutching" control. Similar diode elements D-5, D-6, poled oppositely to the polarity of diodes D-3, D-4, perform a similar function for identifying control voltages developed by the A.-C. control circuit for "braking" excitation of the same servomotor 52. Thus, while diodes D-3, D-4 are supplying polarized control voltage to servomotor 52 for "clutching" action, they are also blocking any possible supply of "braking" control voltages to the "clutch" control circuit; similarly, diodes D-5, D-6 permit supply of oppositely polarized control voltage to servomotor 52 for "braking" action, while blocking any possible supply of "clutching" control voltages to the "braking" control circuit.

On the A.-C. control side of the circuit, the tubes $V_3-V_4$ perform analogously to tubes $V_1-V_2$, and the phase-shifting elements BC-1, BR-1 correspond to elements AC-1, AR-1 on the D.-C. side of the system; transformers T-6, T-7 and T-8 correspond with transformers T-3, T-4 and T-2, respectively. Shunt resistances BR-19 and P-13 determine various amounts of phase-shift to the control circuits of thyratrons, $V_3-V_4$ and thus determine the magnitude of control voltage applied to servomotor 52 for any A.-C. control function ("braking").

*Tachometer Feedback and Current Feedback*

As indicated generally in said Patent No. 2,941,137, the amount of torque called for at the output of my prime-mover mechanism 19, namely, that delivered to the backshaft 20, will depend upon the instantaneous load and the instantaneous momentum of the load, namely, the moving parts of the press. Also, for safety purposes a torque-limiting function is necessary to avoid overloading the electrical system. The speed sensing necessary for such correcting functions may be developed by a tachometer 150, having a field winding 151 excited in parallel with the servomotor field winding 52'. Tachometer 150 may be mounted on the press of FIG. 1 so that its rotor follows backshaft revolutions (see FIG. 3), and it is therefore convenient to refer to this tachometer as the backshaft tachometer. The output of the backshaft tachometer in the form shown is utilized in both the D.-C. or "clutching" phase of operation and the A.-C. or "braking" phase (sometimes referred to herein as "electric braking"), as will later more clearly appear.

A current-limiting safety function may be introduced into the described circuits by means of current transformers respectively coupled to parts of the main supply line so as to reflect instantaneous current drain (and, thus, load) on the electrical system. For sensing such load on the D.-C. control system, I schematically designate a current-transformer pick-off at 153 (see FIGS. 11 and 12), and for a similar sensing whenever the A.-C. control system is operated, I show a similar current transformer pick-off at 154. In FIG. 11 each of these current pick-offs is applied through separate signal-processing circuitry to a particular one of the two basic control circuits, namely, the D.-C. control circuit or the A.-C. control circuit.

For the case of current pick-off governing the D.-C. control circuit, the current transformer 153 develops an output of magnitude suitably proportioned by an initial adjustment at P-12 and full-wave rectified at D-7 for application to the mid-point of the secondary of transformer T-3, which (it will be recalled) couples the phase-shift circuit AR-1, AC-1 to the input or control-grid circuit of the thyratrons $V_1-V_2$. The sense of such connections will be understood to be such that the control-circuit voltage at $V_1-V_2$ is biased or depressed negatively, all in accordance with the instantaneous rectified magnitude of the current sensed at 153 and reflecting load during the D.-C. controlled or "clutching" phase of operation.

For the form shown, backshaft-tachometer voltage is developed at terminals 155-156, and control relay CR-15 determines whether the tachometer voltage will be applied to the D.-C. control circuit or to the A.-C. control circuit; in FIG. 12, relay CR-15 has been identified as the A.-C. stability relay, for a purpose which will later be clear. As shown, normally closed contacts CR-15-2 and CR-15-3 apply the backshaft-tachometer voltage to the D.-C. control circuit by way of a voltage divider AR-6, AR-7 and potentiometer P-7, which is initially adjusted to deliver a desired proportional level of tachometer feed-back into the control circuit for thyratron $V_1-V_2$. The faster the backshaft rotation, the greater the developed tachometer voltage, and the less the need for continued delivery of high torque. Therefore, the sense of connection established by way of voltage divider AR-6, AR-7 and potentiometer P-7 is such as to reduce the level of control voltage applied to the tubes $V_1-V_2$ (with increasing backshaft rotation), all during the D.-C. control or "clutching" phase of operation of the system.

Actuation of the control relay CR-15 is effective to open the connections (CR-15-2 and CR-15-3) to the D.-C. control circuit and to establish backshaft-tachometer connections at contacts CR-15-4 and CR-15-5 to the A.-C. control circuit by way of voltage divider BR-6, BR-7 and voltage divider BR-8, BR-9, BR-10, the connections to the control circuit thyratrons $V_3-V_4$ being made at 157 to the cathodes and at 158 in biasing relation with the control grids. For the form shown, various preset and selectively available resistance values are available for connection in shunt with the backshaft-tachometer feedback to the A.-C. control thyratrons $V_3-V_4$. These adjustably available shunt conditions are determined by potentiometers P-5, P-6, P-8, which are connected or not, depending upon the operation of control relays CR-11 and CR-14 and of a further "low-limit" relay B to be later described. For normal operations involving a necessary reduction in backshaft speed (e.g. "slow-down," "load-control," a programmed speed reduction, and electric braking all to be later described), the sense of connection of backshaft-tachometer feedback to the input circuits of thyratrons $V_3-V_4$ is such that with decreasing backshaft speed, the bias on these input circuits is increased, thus reducing the capacity of tubes $V_3-V_4$ to drive the servomotor 52 and also reducing the capacity for delivery of negative torque; this necessarily also means that if the press is running backwards (as, for example, in reverse-jog or error-reverse operations, to be described), the sign of the tachometer-output voltage is reversed so that with increased backshaft-tachometer speed in the reverse directoin, the tubes $V_3-V_4$ are biased more negatively, thus effecting a speed-limiting control on reverse-driven operations.

On the A.-C. side of the system, the current feedback is picked off at 154 and is processed similarly to that described in connection with the D.-C. side of the system, except that the rectified output of the A.-C. current pick-off (developed at rectifier D-8) is in biasing relation with the backshaft-tachometer voltage; the A.-C. current-feedback voltage is continuously presented across resistor BR-10 (i.e. independent of tachometer feedback). One pole of resistor BR-10 is connected at 157 to the cathode circuits of the tubes $V_3-V_4$, the other pole being connected (via contacts CR-11-4, CR-14-1, and potentiometer P-8) to the midpoint 158 of the grid-circuit transformer T-6. The sense of connection of rectifier D-8 to the A.-C. control circuit is again such as to reduce the output level of tubes $V_3-V_4$ and, therefore, the instantaneous torque developed by servomotor 52 in accordance with detected excessive line current during an A.-C.

operation, the level of such current feedback being adjusted at P-4.

Low-Limit Relay B and the Stability Circuit

Brief mention has already been made of a so-called low-limit relay circuit employing the relay B; this entire circuit is enclosed in light phantom outline in FIG. 11 and has been called the stability circuit.

The function of this circuit is to automatically determine when backshaft-tachometer feedback to the tubes $V_3$–$V_4$ shall be terminated (thus determining a low-speed limit for the backshaft upon deceleration thereof), during one or another of the four speed-reduction functions mentioned above, viz:

(1) *Slow-down.*—This is a programmed midstroke function, that is, it occurs after having fully accelerated the slide and just prior to the tools entering the work, in order to permit performance of the actual work at a slower slide-work speed.

(2) *Load-control.*—This is a programmed function near bottom center (i.e. just prior to and during the actual performance of work), in order to limit the inertia available to carry the press through a normal working stroke; this particular operation is not illustrated in the present drawings but it is entirely analogous to the slow-down operation, the essential difference being one of programmed timing and of desired low-limit speed for load control.

(3) *Speed-reduction.*—This is a programmed function near top center (in the event of a fully automated recycling press operation) in order to allow time for automatic work handling devices to function between working strokes; again, this particular operation is not illustrated in the drawings, but it is entirely analogous to the slow-down operation, the difference again being one of programmed timing and of desired low-limit speed.

(4) *Electric braking.*—This is a principal function of my apparatus and governs negative-torque control to develop zero or substantially zero speed at or near top center.

For the circuit shown, and for the assumed case of switch connections at CR-15-4 and CR-15-5 determining A.-C. control operation, and on the further assumption that one or another of the program-operated relays CR-13, CR-14, CR-17 has been actuated, tachometer-feedback voltage (as modified by one of several control potentiometers P-9, P-10) is inserted in the control-grid circuit of tube $V_5$ governing operation of the low-limit relay B. Normally, that is, in the absence of such applied voltage, the control-grid circuit of tube $V_5$ is supplied by transformer T-12 with an A.-C. voltage in phase with its anode voltage (available from transformer T-10); this means that normally tube $V_5$ conducts, thereby exciting relay B and holding open the contacts B-1 thereof, the contacts B-1 being the means whereby tachometer-fedeback voltage is applicable to the control-circuits of tubes $V_3$–$V_4$. Thus, upon transfer of tachometer voltage to the A.-C. control circuit, a voltage proportional to the instantaneous tachometer output voltage appears across resistor BR-6, and depending upon whether relay CR-13 (on the one hand) or relay CR-14 and CR-17 (on the other hand) have been actuated, the voltage across BR-6 (as modified by the setting of potentiometers P-10, P-9, respectively), will be applied in negative-biasing relation with the steady A.-C. control-grid voltage for tube $V_5$. For any backshaft speed in excess of the desired "low-limit" speed (determined by the preset condition of either of potentiometers P-9 or P-10), tube $V_5$ will be driven to cut off, thus deactivating relay B and allowing contacts B-1 thereof to close, thereby applying tachometer-feedback voltage direct to tubes $V_3$–$V_4$. As explained above, tachometer feedback will assure greater "braking" action for the higher backshaft speeds, such action decreasing as the backshaft speed decreases. Upon sensing the low-limit speed (i.e. when the bias voltage available from the tachometer is no longer able to hold tube $V_5$ cut off), tube $V_5$ will again conduct, to actuate relay B and disconnect (at B-1) the tachometer feedback applied to tubes $V_3$–$V_4$. This means that "braking" action is promptly terminated, and the machine can continue to "coast" until programming reinitiates another "clutching" (D.-C. actuated) or other function.

It has been explained that potentiometers P-9, P-10 determine various low-limit backshaft speeds, depending upon whether relay CR-13 or CR-14 (and CR-17) have been actuated (by program means). At the same time, other contacts of the slow-down relays (CR-14, CR-17) determine that potentiometer P-5 shall be inserted in controlling relation with feedback voltage applied to tubes $V_3$–$V_4$, thus also changing the rate at which negative torque shall be permitted to develop in a slow-down operation.

For normal electric braking, that is, when it is desired to reduce the backshaft speed to zero or to substantially zero speed, there is no need for the same low-limit speed functions achieved for slow-down "load-control," "speed-reduction," etc., as described above, because all the latter functions require development of some finite slow speed in the backshaft 20. For electric braking, on the other hand, the backshaft 20 must be brought to a zero speed or to something close enough to zero such that substantially no energy will be dissipated when the friction brake 37—39 is set to hold the crankshaft 17 at or substantially at top center in readiness for a succeeding press cycle. In spite of this difference in requirements, the stability circuit will be seen to accommodate the situation by using the normally open contacts CR-13-3 of the electric-brake relay CR-13 to insert potentiometer P-10 in the bias-control circuit for tube $V_5$; it will be understood that potentiometer P-10 is preset to cut off tube $V_5$ (and thus permit tachometer feedback to the A.-C. control circuit) until such time that the tachometer output voltage is substantially zero, at which time tube $V_5$ is allowed to conduct again and thus to terminate negative-torque development.

The other functions analogous to slow-down, such as "load-control" and "speed reduction," both being indicated as program-initiated functions, will be understood to be governed by their own separate relays (not shown, but completely analogous to the slow-down relay CR-14, CR-17) operated by suitably positioned limit switches (analogous to slow-down limit switches LS-3, LS-7). Because these functions will call for different low-limit speeds, I suggest in FIG. 11 that the relay CR-20 for one or the other of these functions shall have contacts CR-20-1 to insert another uniquely set potentiometer P-15 in the stability circuit to goven the then-desired different low-limit speed.

Relay Circuits and Limit Switches

More of the specific arrangement for operation of the device of FIG. 1 will be apparent from FIG. 12, which is concerned with the principal supply circuits and with the various relay-control circuits.

Three-phase A.-C. mains are shown at 162, for supplying the motor 41 and the D.-C. control system 160 for the D.-C. flywheel windings, as well as the A.-C. control system 161 for the A.-C. flywheel windings 77—78—79. One of the phases of this supply is also transformed at T-1 to a suitable low-level control voltage available between lines 165—165' across which all control-relay functions are developed. Aside from the various auxiliary relays, namely, LP for the lubricating pump, BM for the blower motor, MR for the motor relay, MU for the up-slide motor, and MD for the down-slide motor, all of which said relays are principally for safety purposes in connection with the auxiliary functions associated therewith, the control relays have particular functions which are in general designated by legends on FIG. 12 but which can be summarized as follows:

CR-1—*Lubricating-system relay.*—This relay functions only when oil-pressure switches 166—166' designate that proper lubricating pressure is being delivered to the mechanism; thus, relay CR–1 is in the nature of a safety interlock with the lubricating system and will not permit the machine to run if lubricating pressure is not at least to a minimum safe level, or if for some reason lubricating pressure becomes excessive.

CR–2—*Press-run relay.*—This relay is actuated when relay CR–1 certifies proper lubricating pressure, and while thermal safety switches 169 (for the main motor 41) and 170 (for the flywheel windings 142—77—78—79) remain closed, and while speed switch 171 (responsive to flywheel speeds between predetermined upper and lower limits) is kept closed; its normally open contacts CR–2–3 dominate all operations of the machine.

CR–3—*Error set-up relay.*—This relay is effective essentially during the first half (downstroke) of the press cycle. It is activated by coincidental operation of the non-repeat relay (CR–6) and of the brake air-pressure relay (CR–9), meaning that the run buttons 180—181—182—183 are held in and that the brake 37—39 is actuated to the released condition. The function of this relay CR–3 is to condition the error-reverse relay (CR–5) for actuation should an operator prematurely release any one of the run buttons and drop out the run set-up relay (C–19). Relay CR–3 continues to function until the automatic-run circuit assumes control upon closure of limit switch LS–2 at just short of bottom center (see FIG. 13).

CR–4—*Motor start relay.*—This relay is in series with the start button and has hold-in contacts CR–4–2; it has other contacts (not shown) for starting and running the motor 41.

CR–5—*Error-reverse relay.*—This relay functions to throw the whole mechanism into reverse, i.e. to reverse the backshaft and withdraw the press slide 11, in the event that an operator should prematurely release any one of the run buttons 180—181—182—183 prior to the time limit switch LS–2 closes.

CR–6—*Non-repeat relay.*—The coil for this relay is in series with the normally closed contacts of the run buttons and of limit switch LS–1. Limit switch LS–1 is closed for the 180° interval running from just before top center to just before bottom center, and thus for the period from just before bottom center to just before top center relay CR–6 assures against automatic completion of a run cycle should there be a power failure or other stoppage of the press during this latter half of the press cycle. Also, if one of the thermal safety switches 169—170 should open during this latter period, or if oil-pressure should fail or flywheel speed drop too low, relay CR–6 will enable completion of the current press cycle but will prevent initiation of a succeeding stroke.

CR–7—*Run relay.*—This relay maintains interlock continuity for D.-C. clutching (via normally open contacts CR–7–4) and for the initiation of electric-braking (including slow-down) via normally open contacts CR–7–3. It has hold-in contacts CR–7–1, and further normally open contacts CR–7–2 for assuring operation of the stroke counter 167 only when the press is running; this assures that the stroke counter will register only press cycles run in the normal fashion, i.e. no counter will be registered for any jogging operations.

CR–8—*Holding-brake relay.*—This relay controls the holding-brake air-valve solenoid 176 via normally open contacts CR–81.

CR–9—*Brake air-pressure relay.*—This relay is actuated only when the holding-brake released switch certifies that adequate pressure has been supplied to the friction brake 37—39 to hold the same released.

CR–10—*Selector relay for low-speed jogging.*—This relay is actuated upon selection of low-speed jogging, and its normally open contacts CR–10–1 govern insertion of low-speed-jog phase-shift potentiometer P–11.

CR–11—*Jog-reverse relay.*—This relay is actuated upon selection of jog reverse at the jog-direction selector switch; its normally open contacts CR–11–7 govern operation of the A.-C. stability relay CR–15, its normally open contacts CR–11–1 govern insertion of phase-shift potentiometer P–13 in the A.-C. torque control circuit, and its normally open contacts CR–11–2 and CR–11–3 insert potentiometer P–6 in the feedback or A.-C. speed-control circuit.

CR–12—*Flywheel-brake relay.*—This relay governs D.-C. excitation to lock the stator and rotor 25—26 only when the friction brake 37—39 is engaged, so that all rotating parts may be promptly arrested, as when shutting down the machine. Shut down is accomplished by pressing button 177 only after first deenergizing motor-start relay CR–4 by pressing the stop button therefor, thus completing the shut-down circuit via normally closed contacts CR–4–3.

CR–13—*Electric-brake relay.*—This relay is utilized only in normal run cycles and is actuated by limit switches LS–4, LS–9 when the run-selector switch has been operated; these limit switches will be seen in FIG. 13 to to enable CR–13 for all except the "at-rest" position at or near top center. Its normally open contacts CR–13–2 govern the A.-C. stability relay CR–15 and its normally open contacts CR–13–3 govern a zero or near-zero low-limit control of the stability circuit, as explained above. Its normally open contacts CR–13–1 provide a hold-in function until limit switches LS–3 and LS–9 break the circuit near top center, all regardless of subsequent opening of the run-relay contacts CR–7–3.

CR–14—*Slow-down relay.*—This relay is supplemented by relay CR–17 to provide additional contacts and is utilized in the substantially 90° mid-stroke, i.e. just before entering the work, and is actuated by limit switches LS–3, LS–7 (see FIG. 13) when both the run-selector-switch and the slow-down selector switch have been operated. Its normally open contacts govern the A.-C. stability circuit relay CR–15, and its normally open contacts CR–17–3 and CR–17–4 govern insertion of the low-limit potentiometer P–9 in the stability circuit; its normally open contacts CR–14–3 also govern insertion of A.-C. torque control potentiometer P–5, determining the limiting rate of the slow-down function.

CR–15—*A.-C. stability relay.*—This relay governs transfer of tachometer connections from the D.-C. or "clutching" control circuit to the A.-C. or "braking" control circuit. When operated it provides a sampling voltage across resistor BR–6 for operation of the stability circuit, as well as a feedback voltage across BR–9 as above described. Its normally open contacts CR–15–6 supplement the function the run set-up relay contacts CR–19–2 to keep the friction brake released as long as A.-C. control-circuit operations are proceeding (i.e. during electric braking, slow-down, etc.).

CR–16—*High-speed relay.*—This relay is available as an alternative for the low-speed jog relay CR–10, upon operation of the jog-speed selector; its normally open contacts CR–16–1 govern insertion of high-speed-jog phase-shift potentiometer P–2.

CR–17—*Slow-down relay.*—This relay operates coincidentally with slow-down relay CR–14 merely to provide additional contacts.

CR–19—*Run set-up relay.*—This relay is actuated by the run buttons 180—181—182—183 through their normally open contacts. Its normally open contacts CR–19–2 operate the holding (friction) brake release relay CR–8 to disable this brake during a run, and its normally closed contacts CR–19–1 are used to actuate the error relay CR–5 in the event that one of the run buttons should be released during the advance portion of the stroke, determined by limit switch LS–2 (see FIG. 13).

CR–20—*"Load-control" or "speed-reduction" relay.*—This relay is entirely analogous to relay CR–13 and its normally open contacts CR–20–1 determine insertion of low-limit potentiometer P–15 in the A.-C. stability circuit.

Various limit switches are shown in FIG. 12 and most of these are contained within the program device contained within the program device containing adjustable cams and designated 23 in FIG. 1. The typical programming effected by these switches is suggested in the diagram of FIG. 13 and is shown to govern limit switches LS–1, LS–2, LS–3, LS–4, LS–5, LS–7 and LS–9; limit switch LS–8 is also within device 23 but is not shown in FIG. 13 because it merely provides a cycle-counting function used to trip the counter 167 (see FIG. 12). The limit switches LS–3 and LS–7 are in series and therefore effectively determine a single mid-stroke function which, according to FIG. 13, closes the circuit for slow-down action substantially at 75° and opens the same substantially at 150°, i.e. just before entering the work. In the same manner, the top-stop electric-brake action is governed by limit switches LS–4 and LS–9 in series with relay CR–13, closing at substantially 315° and opening at substantially 350°.

OPERATION

The described system will be better understood from a description of the typical operation. First, of course, it is necessary to set the flywheel 25 in motion and for this purpose, the motor 41 is excited (having first started the lubricating pump). To do this, the motor-start button 168 is depressed to complete the circuit to the motor-start relay CR–4. This actuates the normally open contact CR–4–1 to complete the circuit for motor relay MR having contacts MR–1, MR–2, MR–3 for applying three-phase excitation to the motor 41; relay MR has further hold-in contacts MR–4 for the motor-start relay CR–4 and for a motor-running indicator lamp. Safety features for the motor 41 may include thermal protection element 169. Other safety features include the oil-pressure switches 166—166' as discussed above, as well as lamps to indicate that the lubricating system is running satisfactorily or that a fault has developed, such parts and functions being apparent from legends on the diagram. In connection with the lubricating system, it will be noted that the normally open contacts CR–2–4 of the press-run relay prevent operation of the lubricating-pump stop button as long as thermal switches 169—170 and the minimum-speed part of switch 171 are kept closed, meaning normal running.

A normal run-cycle of the mechanism is graphically depicted in FIG. 14 and is available by operation of the run-selector switch having contacts 172—173—174 which enable the various run circuits and the electric-brake and error set-up circuits. It will be assumed that the selected operation is to be a single-stroke operation as, for example, a normal draw involving a mid-stroke slow-down, in which case the Slow-Down Selector will first have been operated. The mere operation of the selector switch to close contacts at 172—173—174 completely sets up the machine for the desired operation, the cycle being commenced upon closure of the manual run-buttons, 180—181—182—183, meaning that all operators' hands are safely out of the way of moving press parts. The manual switch 175 will normally be closed and is used only to isolate a major segment of the control circuits for safety when servicing.

Assuming now that the motor 41 has brought the flywheel into satisfactory rotation, this fact will be manifested by correct operation of the lubrication pressure interlock system whereby the lubricating system relay CR–1 is picked up. This enables the contacts CR–1–1 of the lubricating system relay to close and to actuate the press run relay CR–2 as soon as the speed switch 171 on the shaft of motor 41 signifies an adequate speed of rotation, upon centrifugal closure of the same. Operation of relay CR–2 closes contacts CR–2–2 thereof, and thus completes the circuit through limit switch LS–1 (and numerous normally closed contacts of manual safety switches 180—181—182—183) in the non-repeat circuit, to pick up the relay CR–6. Operation of the relay CR–6 picks up hold-in contacts CR–6–1 and completes the circuit through contacts CR–6–2 to the normally open contacts of run buttons or manual safety switches 180—181—182—183 and to the normally closed contacts CR–5–2 of the error relay CR–5. The press is now ready for operation.

In order to start the press, all four operators must be sufficiently clear of the work to operate both the left and right halves of the switches 180—181—182—183 so as to complete the circuit to the run set-up relay CR–19. Once relay CR–19 picks up, a circuit is completed via contacts CR–19–2 to operate the holding brake (i.e. to release the same), and the normally closed contacts CR–19–1 in the error circuit of relay CR–5 are opened to allow the press cycle to proceed. Once the brake is released, this fact is manifested by sufficient release pressure to operate the holding-brake release switch and to complete a circuit to the brake-release relay CR–9. As soon as the brake release relay CR–9 picks up, its normally open contacts CR–9–1 complete a circuit to the run relay CR–7 having contacts CR–7–4 serving to insert the run-reference potentiometer P–1 in the D.-C. or "clutching" phase-shift circuit for determining a run developing positive torque in the servomotor 52 and associated circuits of FIG. 6.

It will be noted that all operators must keep both hands on their respective right and left halves of switches 180—181—182—183 for virtually the entire down-stroke of the slide 11 because there is no other way to maintain the circuits of the run relay CR–7 closed, except by keeping all these manually operated switches closed. However, once the press parts have safely entered the work and the down stroke is virtually over, the limit switch LS–2 is closed to complete a circuit to the hold-in contacts CR–7–1 of the run relay CR–7, so that thereafter the operators may safely withdraw their hands and the machine will proceed through its normal cycle.

It will be noted that once the machine has commenced to drive the press downward and has passed a position of substantially 30° rotation of the main crankshaft 17, the error reverse limit switch LS–5 becomes closed. This completes a circuit to contacts CR–6–3 of the non-repeat relay and through contacts CR–9–3 of the brake-release relay to the error set-up relay CR–3. Once actuated, relay CR–3 is held in by its hold-in contacts CR–3–1, and further contacts CR–3–2 are closed in the circuit of the error-reverse relay CR–5, it being remembered that contacts CR–19–1 in the same circuit are held open as long as the press is running normally. Now, if through some inadvertence, an operator should take his hand off one of the switches 180—181—182—183, the circuit to the run set-up relays CR–19 will be broken, so that the contacts CR–19–1 thereof will close, and a circuit will be completed to the error-reverse relay CR–5, thus positively opening the normally closed contacts CR–5–2 thereof and preventing the re-excitation of relay CR–19 or of relay CR–7 by attempting to manually close whichever one of the left or right-hand switches of run-button stations 180—181—182—183 may have been transiently interrupted. Actuation of the error-reverse relay CR–5 has the further effect of closing its normally open contacts CR–5–1 to complete a circuit to the reverse-jog relay CR–11, otherwise employed for reverse jogging. Operation of the reverse-jog relay CR–11 picks up the normally open contacts CR–11–7 thereof and thus completes the circuit to the A.-C. stability relay CR–15. Operation of these two relays CR–11 and CR–15 will be seen from FIG. 11 to throw the control connection for the backshaft tachometer over to the A.-C. control-circuit side and to place the reverse drive speed for the backshaft 20 under the control of potentiometer P–6 via contacts CR–11–2 and CR–11–3; because, at this instant of error detection, the press is already running forward, the polarity and magnitude of tachometer feedback to the A.-C. control circuit is such as to develop virtually the maximum possible negative torque instantaneously. Thus, as soon as an operator takes his hand off of one of the safety switches, provided this occurs in the effective interval (between substantially 30° to 170°) for the error-reverse limit switch LS–5, the slide is automatically thrown into full-speed reverse and, of course, cannot descend but is returned at once to the top-center position, the mechanism being brought to a halt by the friction brake once the error-reverse limit switch LS–5 has traversed the 30° position in a reverse direction.

Returning now to the normal operation of the machine for a draw with mid-stroke slow-down, the initial application of torque via the D.-C. control circuit, as determined by the reference potentiometer P–1 is limited only by the detected current consumption as sensed at 153. This limit of current is depicted at the level 184 in curve d of FIG. 14 and determines the greatest rate at which backshaft r.p.m. can rise, in other words, the limiting acceleration of the system. The actually achieved top speed noted at 185 (curve c) for the backshaft r.p.m. is governed by the backshaft tachometer feedback as sensed via potentiometer P–7; and, once the maximum velocity 195 has been developed, tachometer feedback will reduce the torque output of servomotor 52 so as to reduce the torque output or current consumption for the clutching phase of operation. This reduced current consumption is to be noted at 186 in curve d of FIG. 14 and is characteristic of the initial phase of operation of the press wherein the slide is being rapidly accelerated and advanced toward the work.

In the mid-stroke region before the dies on the slide 11 enter the work, it is desirable to slow down the approach to the work in order not to inadvertently shear or pierce the work. In other words, it is desirable to limit the relative speed of the dies and the work for an optimum working effectiveness. The location at which this occurs is, of course, a function of the working fraction of the stroke and of the particular work involved, and in the form shown, limit switch LS–3 is set to close at the 75° position in order to determine the commencement of the slow-down operation. It has been noted above that both limit switches LS–3 and LS–7 function in overlapping relation, and that their series connection provides for closure of the slow-down circuit for the interval essentially 75° to 120°. Closure of this circuit activates control relays CR–14 and CR–17, and at the same time contacts CR–14–6 on control relay 14 complete the A.-C. stability circuit so as to energize the relay CR–15 for transferring all control operations from the D.-C. or clutching side of the system to the A.-C. or braking side.

The contacts CR–14–3 and CR–14–4 of relay CR–14 connect potentiometer P–5 in the A.-C. control circuit to impose reference torques on the slow-down operation, and of course current-limiting is performed via the potentiometer P–4. The net effect of these connections is to apply maximum or at least a high negative output torque to the backshaft 20, meaning strong deceleration and effective braking by reason of reaction against the momentum of the flywheel 25. As the backshaft rotation is reduced to a relatively slow speed, determined by that speed at which potentiometer P–9 fails to develop sufficient bias voltage to maintain tube V₅ in the cut-off condition, A.-C. excitation continues to decelerate backshaft 20. However, upon attainment of the low-limit backshaft speed (determined by the P–9 setting), A.-C. excitation is effectively terminated, and this occurs just prior to entering the work. The press then coasts, allowing press momentum to carry the slide through initial phases of the draw, it being noted that at this point in the cycle the crankshaft 17 is approaching the bottom-center position, and therefore increasingly greater mechanical advantage is being developed in the crankshaft connection to the slide 11, so that even though the backshaft 20 may be decreasing in speed, a slow and relatively uniform draw illustrated at 188 may be developed without any connection to the prime mover. This phase of operation is terminated when the program means 23 opens limit switch LS–7, that is, near the 150° position, so as to then break the circuit to control relays CR–14 and CR–17, and therefore also to the stability relay CR–15. Of course, it will be understood that for deep-draw operations (which may involve work entry at say the 110° position), slow-down or speed-reducing controls will have adjusted to assure adequately slow die entry into the work.

As soon as relay CR–15 is de-energized, normally closed contacts CR–15–2 and CR–15–3 re-establish control connections to the D.-C. or clutching side of the system, at which time the servomotor torque is again dominated by the run-reference potentiometer P–1 with tachometer and current feedback control established by potentiometers P–7 and P–12, respectively. The effect of re-clutching is of course to develop an initial high surge of current limited as suggested at 184' and dropping off to a level 186' as the tachometer feedback takes over, reducing the demand for backshaft torque development. Thus, once the draw 188 has been substantially developed, the mechanism can be rapidly re-accelerated to complete its cycle with maximum velocities imparted to the slide with substantially simple-harmonic motion characteristics, as suggested at 190 on curve b of FIG. 14.

Upon approach to the top-center position, the limit switch LS–4 cuts off the D.-C. excitation, and this is shown to occur substantially at 315°, and to involve excitation of the electric-brake relay CR–13 having holding contacts CR–13–1 and having contacts CR–13–2 which close to complete the circuit to the A.-C. stability relay CR–15. This has the immediate effect of disconnecting all D.-C. control and transferring control to the A.-C. side of the system, whereby negative torque referenced on the potentiometer P–8 is developed to produce rapid deceleration of the backshaft 20. The lowest speed limit for application of negative torque to decelerate the backshaft is determined by potentiometer P–10, and when the backshaft tachometer fails to generate sufficient voltage for potentiometer P–10 to hold tube V₅ cut-off, then tube V₅ again conducts to excite the relay B for effective disconnection of the A.-C. excitation and (when limit switch LS–9 opens) for automatic application of the friction brake 37—39 of FIG. 3.

As will be seen from curve c of FIG. 14, the speed at which the friction brake is called into play is determined by the setting of potentiometer P–10 and may be substantially reduced from that at which potentiometer P–9 determines the lower limit of slow-down operation, and this instant is indicated at 189. This low limit near top center occurs within the last few degrees just preceding top center, at which time the slide 11 has been reduced to substantially zero velocity, so that minimum momentum is reflected into the backshaft 20 and so that minimum frictional losses are dissipated in the operation of the friction brake, the maximum decelerating energy having been applied by reaction through A.-C. excitation to develop negative torque against the flywheel element 25.

It will be appreciated that in addition to the normal single-stroke draw operation with mid-stroke slowdown as described in detail above, my press and drive mechanism may be caused to perform many further functions, thus rendering the machine most flexible as to set-up and as to actual control of the tools with reference to the work.

The system lends itself furthermore to extreme flexibility in jogging operations that is in operation in which the only motion desired in the press slide 11 is motion developed when a jog button is held depressed by the operator, the various job-selector switches including the push button 192 calling for each jog of the mechanism, it being noted that jog forward may be selected for either of two speeds, a high speed in which the control relay CR–10 is energized, and a low speed in which the control relay CR–16 is energized. Furthermore, jog direction can be selected for forward and reverse, the reverse connection involving operation of the control relay CR–11. In a forward jogging operation, high torque (that is, upon operation of control relay CR–16) is referenced on the potentiometer P–2, and low torque is referenced (by relay CR–10) on the potentiometer P–11. In each case, tachometer feedback and current feedback are referenced on the potentiometers P–7 and P–12, as previously described for the D.-C. or clutching phase of operation. Forward jog may be continued throughout the full cycle of the machine as long as the jog push button 192 is held depressed, no matter how many times the push button 192 may be released during the course of the full press cycle. It will be noted that in the operation of forward jog, the D.-C. side of the system is the only side used. In other words, when the jog-forward button is released D.-C. excitation is cut off, but no A.-C. excitation is applied. The friction brake 37—39 is, however, operated whenever the D.-C. excitation is cut off, thus assuring positive movement substantially only during depression of the jog button 192.

Reverse jog proceeds on essentially the same basis except that relay CR–11 is involved, in which case potentiometer P–13 serves as torque reference in the phase-shifting network, and potentiometers P–6 and P–4 develop the tachometer and current reference voltages in the respective feedback circuits. Again, in operation of the reverse-jog phase of the machine, A.-C. excitation alone is involved. In other words, whenever A.-C. excitation is cut off, there is no D.-C. clutching, and the mechanical brake alone is relied upon to stop the mechanism.

For simplicity and clarity of explanation, discussion of the invention set forth hereinabove has referred in the alternative to excitation of windings 33 either for "motoring" (or "braking") action or for "clutching" action because it is believed that a clearer understanding results from a separate consideration of the functions of these parts. However, it will be appreciated that under certain circumstances, it may be desirable to provide "simultaneous" or "overlapping" excitation of windings 33. In such case, the separate windings 142 and 77—78—79 (FIG. 10) independently accommodate the two different kinds of excitation, and excitation of the motoring and clutching elements is differentially and concurrently controllable by resetting the positions of means, as for example arms 46—46' on the servomotor drive shafts 53 to provide the desired overlap.

With separate motoring and clutching windings on the input member, transfer from predominantly motoring excitation (i.e. braking, for positive-torque development; clutching, for negative-torque development) to predominantly clutch control (clutching, for positive-torque development; braking, for negative-torque development) of the output shaft or backshaft 20 may be on a "tightly controlled" faster-response basis. With the employment of separate motoring and clutching windings on the members 25—26, the terms "excitation," "energizing," "de-energizing," and the like, herein, will thus be understood to be relative terms, meaning that the torque developed upon excitation of one winding of input member 25 (e.g. motoring or clutching) shall predominate over the torque developed upon excitation of another winding (e.g. clutching or motoring). Control means 75—75', 86—86', 87—87' and 120—121 . . . 125 of FIG. 10 will be understood to sufficiently designate control means for effective output-torque development through simultaneous excitation of the windings on the member 25 to provide motoring and clutching action by determining which of these windings shall develop the predominant torque at any one time. In this manner, full control from full-speed forward down to slow-speed forward, stop, and reverse, is available depending upon the sequencing and relative magnitude of the motor or clutch torques caused to predominate.

It will be appreciated that I have described a novel and ingenious control means, having particularly useful application in machines requiring transient application of torque, as for example, presses, such as that of FIG. 1. It is particularly significant that with control circuits of the type discussed in connection with FIG. 11 in conjunction with that discussed at 75, it is possible to achieve reliably defined fine increments of power delivered to the load, and it is possible to provide multiple feedback regulation of these mounts of power, whether a positive-output torque is demanded, or a negative-output torque is demanded, and more or less regardless of the magnitude of the torque demanded. In the particular application, which I have made of my invention to presses, I have employed a relatively high-torque low-inertia servomotor at 52 and have been able to transfer from full clutching torque (meaning full displacement of the clutch synchro generator 50) to full braking torque (meaning full displacement of the brake synchro generator 51) in a matter of one-hundredths of a second. I have also been able to "jog" a heavy output load such as the slide 11 of an 800-ton power press with rapid alternation between various levels of clutching torque. The resulting interphase transients have not been such as to disturb the proper firing control in the clutching circuits of FIG. 6 or the braking circuits of FIG. 7.

Insofar as prime movers of the character indicated are concerned, it is particularly important that the energy of the system can be conserved by reacting between the relatively movable parts of the prime mover and its load (i.e. the machine on which operations are being performed), there being no need to dissipate energy by braking with reference to the frame or by accelerating with reference to the frame, except as necessary to effect minor adjustments in speed. A substantial amount of braking effort is achieved through motoring action which serves the dual purpose of braking the output shaft 20 and of re-accelerating the flywheel 25 substantially to the desired speed. In the specific application herein described in reference to the press of FIG. 1, it is, of course, desirable to employ a friction brake referencing the movable parts to the frame at least once per cycle because of the need to synchronize with the actual cycle of the machine and because of the usual situation in which the slide 11 must be brought to rest at top-center position for removal and insertion of work.

While I have described the invention in detail for the preferred forms illustrated, it will be understood that modifications may be made within the scope of the invention as defined in the claims which follow.

I claim:
1. In a power press, a frame, a slide reciprocable in said frame, crankshaft means for imparting slide displacement in a cycle comprising the half cycle displacement from top center to bottom center and the return half cycle, drive means for said crankshaft including two relatively rotatable members, the first of which has a relatively high moment of inertia compared to that of the second, winding means coacting between said members, means for exciting said winding means to produce positive output-torque development, means for exciting said winding means to produce negative output-torque development, and control means related to a cycle of rotation of said crankshaft coupled to each of said exciting means to determine a sequenced program of predominantly positive output-torque development and of predominantly negative output-torque development for a cycle of said crankshaft, said predominantly positive and negative output torque being produced in programmed sequence during the half cycle from top center to bottom center, and being produced in programmed sequence during the return half cycle.

2. In a power press, a frame, a slide reciprocable in said frame, crankshaft means for imparting slide displacement in a cycle of top center to bottom center and return, drive means for said crankshaft including two relatively rotatable members, the first of which has a relatively high moment of inertia compared to that of the second, winding means coacting between said members, means for exciting said winding means to produce positive output-torque development, means for exciting said winding means to produce negative output-torque development, and program means related to a cycle of rotation of said crankshaft and determining a sequenced program of positive output-torque development and of negative output-torque development for a cycle of said crankshaft, and switch-operated means independent of said program means and operative to disconnect one of said exciting means and to connect the other of said exciting means to said winding means for instantaneously reversing torque development in reference to said member having high moment of inertia.

3. In a power press, a frame, a slide reciprocable in said frame, crankshaft means for imparting slide displacement in a cycle of top center to bottom center and return, drive means for said crankshaft including two relatively rotatable members, the first of which has a relatively high moment of inertia compared to that of the second, winding means coacting between said members, means for exciting said winding means to produce positive output-torque development, means for exciting said winding means to produce negative output-torque development, and program means related to a cycle of rotation of said crankshaft and determining a sequenced program of positive output-torque development and of negative output-torque development for a cycle of said crankshaft, and switch-operated means effective during essentially the downstroke phase of operation of said press and operative to change connection of said winding means from one to the other of said exciting means.

4. In a power press, a frame, a slide reciprocable in said frame, crankshaft means for imparting slide displacement in a cycle of top center to bottom center and return, drive means including a variably coupled connection to crankshaft, program means related to a cycle of rotation of said crankshaft and determining a sequenced program of coupling to said crankshaft for advancing the same through said cycle in a first direction, and means independent of said program means and effective during essentially the downstroke phase of operation of said press and operative to reverse the coupling of said drive means to said crankshaft.

5. In a power press, a frame, a slide reciprocable in said frame, crankshaft means for imparting slide displacement in a cycle of top center to bottom center and return, drive means for said crankshaft including selectively available a positive-torque connection and a negative-torque connection to said crankshaft, said positive-torque connection being connected in driving relation with said crankshaft during a normal run of said cycle and including a negative-feedback control responsive to crankshaft speed, and reversing means operative during an intermediate part of said cycle and replacing said positive-torque connection with said negative-torque connection and simultaneously placing the output of said feedback control in positive-feedback relation with said negative-torque connection.

6. In a power press, a frame, a slide reciprocable in said frame, crankshaft means for imparting slide displacement in a cycle of top center to bottom center and return, drive means for said crankshaft including two relatively rotatable elements, one of which has relatively high moment of inertia, means for continuously rotating said one element in one direction, electric winding means coacting between said elements, first control means exciting said winding means to develop positive output torque in said crankshaft, second control means exciting said winding means to develop negative output torque in said crankshaft, program means related to a cycle of rotation of said crankshaft and determining a sequenced program of operating said respective control means to determine a single direction of fully cycling said press, and switch-operated means independent of said program means and operative only during essentially the downstroke phase of operation of said press to actuate that one of said control means which will drive the crankshaft in reverse.

7. In a power press, a frame, a slide reciprocable in said frame, crankshaft means for imparting slide displacement in a cycle of top center to bottom center and return, drive means for said crankshaft including two relatively rotatable elements, one of which has relatively high moment of inertia, means for continuously rotating said one element in one direction, electric winding means coacting between said elements, first control means exciting said winding means with direct current to develop positive output torque in said crankshaft, second control means exciting said winding means with alternating current to develop negative output torque in said crankshaft, program means related to a cycle of rotation of said crankshaft and determining a sequenced program of operating said respective control means to determine a single direction of fully cycling said press, and switch-operated means independent of said program means and operative only during essentially the downstroke phase of operation of said press to actuate said second control means for maximum negative-output torque, whereby the press will be thrown into full reverse operation upon actuation of said switch-operated means.

8. In a machine of the character indicated, a frame and rotatable means journalled therein, drive means for said rotatable means and including two relatively rotatable members, the first of which has a relatively high moment of inertia compared to that of the second, said second rotatable member being connected to drive said rotatable means, winding means coacting between said members, first control means for exciting said winding means to develop positive output torque, second control means for exciting said winding means to develop negative output torque, program means in actuating relation with both said control means for determining a sequenced program of positive output-torque and of negative output-torque development, tachometer means driven by said rotatable means and in negative-feedback controlling relation with one of said control means and including means adjusted in maximum forward-speed limiting relation with one of said control means, and tachometer-operated minimum forward-speed limiting relay means in controlling relation with the other of said control means, whereby upon a programmed shift from said one to said other control means said relay means may effectively cut off said other control means upon achievement of the minimum limit of forward speed.

9. The machine of claim 8, in which said relay means includes an electron-discharge device having an input circuit connected to the output of said tachometer, the sense of such input-circuit connection being such that said device is biased at least to cut-off for tachometer-output voltages in excess of that representing said minimum forward-speed limit.

10. In a power press, a frame, a slide reciprocable in said frame, crankshaft means for imparting slide displacement in a cycle of top center to bottom center and return, drive means for said crankshaft including two relatively rotatable elements, one of which has relatively high moment of inertia, means for continuously rotating said one element in one direction, electric winding means coacting between said elements, first control means exciting said winding means to develop positive output torque in said crankshaft, second control means exciting said winding means to develop negative output torque in said crankshaft, program means related to a cycle of rotation of said crankshaft and determining a sequenced program of operating said respective control means to determine correspondingly sequenced delivery of positive and negative torque applied to said crankshaft in reference to said element having relatively high moment of inertia, said program means including first control-element means operative substantially at top center and actuating said first control means substantially to the exclusion of said second control means for positive-torque development, second control-element means operative between top and bottom center and actuating said second control means substantially to the exclusion of said first control means for negative-torque development, third control-element means operative substantially at bottom center and actuating said first control means substantially to the exclusion of said second control means for renewed positive-torque development, and fourth control-element means operative upon approach to top center and actuating said second control means substantially to the exclusion of said first control means for renewed negative-torque development.

11. The press of claim 10, in which said second control-element means includes means responsive to low-limit speed of said crankshaft in excess of zero but less than that developed by said first control-element means and effective to de-activate said second control means upon attainment of said low-limit speed.

12. The press of claim 11, in which said fourth control-element means includes means responsive to a second low-limit speed of said crankshaft near zero speed of said crankshaft and effective to de-activate said second control means upon attainment of said second low-limit speed.

13. The press of claim 11, in which said fourth control-element means includes means responsive to a second low-limit speed of said crankshaft near but short of zero speed of said crankshaft and effective to de-activate said second control means upon attainment of said second low-limit speed, whereby near top center said crankshaft can be reduced to said second low-limit speed and permitted to coast at said second low-limit speed for further approach to top center, and braking means timed by said program means close to top center and reacting between said crankshaft and said frame to positively arrest said crankshaft close to top center.

14. The press of claim 10, in which said second control-element means is effective substantially in the mid-stroke region of said press and prior to work entry, whereby the press tools may be caused to approach the work at maximum speed while permitting relatively slow entry of the tools in the work.

15. The press of claim 10, in which said second control-element means is effective in the region immediately prior to bottom center, whereby the press tools may be caused to operate on the work at a definitely limited relatively slow speed.

16. In a power press, a frame, a slide reciprocable in said frame, crankshaft means for imparting slide displacement in a cycle of top center to bottom center and return, drive means for said crankshaft including two relatively rotatable elements, one of which has relatively high moment of inertia, means for continuously rotating said one element in one direction, electric winding means coacting between said elements, first control means exciting said winding means to develop positive output torque in said crankshaft, second control means exciting said winding means to develop negative output torque in said crankshaft, program means related to a cycle of rotation of said crankshaft and determining a sequenced program of operating said respective control means to determine a single direction of fully cycling said press, and reverse-jog means comprising switch-operated means disabling said program means and in selective actuating relation with said second control means exclusively.

17. In a power press, a frame, a slide reciprocable in said frame, crankshaft means for imparting slide displacement in a cycle of top center to bottom center and return, drive means for said crankshaft including two relatively rotatable elements, one of which has relatively high moment of inertia, means for continuously rotating said one element in one direction, electric winding means coacting between said elements, first control means exciting said winding means to develop positive output torque in said crankshaft, second control means exciting said winding means to develop negative output torque in said crankshaft, program means related to a cycle of rotation of said crankshaft and determining a sequenced program of operating said respective control means to determine a single direction of fully cycling said press, forward-jog means comprising switch-operated means disabling said program means and in selective actuating relation with said first control means exclusively, and reverse-jog means comprising switch-operated means disabling said program means and in selective actuating relation with said second control means exclusively.

18. In a power press, a frame, a slide reciprocable in said frame, crankshaft means for imparting slide displacement in a cycle of top center to bottom center and return, drive means for said crankshaft including two relatively rotatable elements, one of which has relatively high moment of inertia, means for continuously rotating said one element in one direction, electric winding means coacting between said elements, first control means exciting said winding means to develop positive output torque in said crankshaft, second control means exciting said winding means to develop negative output torque in said crankshaft, program means related to a cycle of rotation of said crankshaft and determining a sequenced program of operating said respective control means to determine a single direction of fully cycling said press, brake means reacting between said crankshaft and said frame for positively arresting said crankshaft, and reverse-jog means comprising switch-operated means disabling said program means and in selective actuating relation with said second control means exclusive of said first control means, said switch-operated means being also in controlling relation with said brake means in the sense applying said brake means substantially when said jog means is released.

19. In a power press, a frame, a slide reciprocable in said frame, crankshaft means for imparting slide displacement in a cycle of top center to bottom center and return, drive means for said crankshaft including two relatively rotatable elements, one of which has relatively high moment of inertia, means for continuously rotating said one element in one direction, electric winding means coacting between said elements, first control means exciting said winding means to develop positive output torque in said crankshaft, second control means exciting said winding means to develop negative output torque in said crankshaft, program means related to a cycle of rotation of said crankshaft and determining a sequenced program of operating said respective control means to determine a single direction of fully cycling said press, brake means reacting between said crankshaft and said frame for positively arresting said crankshaft, forward-jog means comprising switch-operated means disabling said program means and in selective actuating relation with said first control means to the exclusion of said second control means, and reverse-jog means comprising switch-operated means disabling said program means and in selective actuating relation with said second control means to the exclusion of said first control means, both said switch-operated means being also in controlling relation with said brake means in the sense applying said brake means substantially when an actuated jog means is released.

20. In a power press, a frame, a slide reciprocable in said frame, crankshaft means for imparting slide displacement in a cycle of top center to bottom center and return, drive means for said crankshaft including two relatively rotatable masses and electric winding means coacting between said masses, two separate phase-sensitive power-control circuits having different connections to said winding means, two variable phase-shifting devices respectively connected in controlling relation with the power-control circuits, means differentially connecting said phase-shifting devices, first feedback-control means responsive to the instantaneous relative torque load on said masses and in controlling relation with a first of said phase-shift control means, second feedback-control means responsive to the instantaneous relative torque load on said masses and in controlling relation with the other of said phase-shifting devices, and program means related to a cycle of rotation of said crankshaft and determining a sequenced program of predominant control first by one of said phase-shifting devices and then by the other of said phase-shifting devices.

21. In a power press, a frame, a slide recprocable in said frame, crankshaft means for imparting slide displacement in a cycle comprising the half cycle displacement from top center to bottom center and the return half cycle, drive means for said crankshaft including two relatively rotatable masses, winding means coacting between said masses, a first phase-sensitive power-control circuit connected to said winding means for A.-C. excitation thereof and including a variable phase-shifting control means device, a second separate phase-sensitive power-control circuit also connected to said winding means for D.-C. excitation thereof and including a separate variable phase-shifting control device, first current-responsive means responsive to consumption of D.-C. power and in feedback-regulating relation with the phase-shifting device associated with said D.-C. power-control circuit, a second current-responsive device responsive to consumption of A.-C. power and connected in feedback-controlling relationship with the variable phase-shifting device associated with said A.-C. power control circuit, and control means related to a cycle of rotation of said crankshaft coupled to each of said exciting means to determine a sequenced program of predominant control first by one of said phase-shifting devices and then by the other of said phase-shifting devices, each of said devices being programmed to effect control sequentially during the half cycle from top center to bottom center and to effect control sequentially during the return half cycle.

References Cited in the file of this patent

UNITED STATES PATENTS

| | | |
|---|---|---|
| 1,669,150 | Umansky | May 8, 1928 |
| 1,826,054 | Chryst | Oct. 6, 1931 |
| 2,489,198 | Russell | Nov. 22, 1949 |
| 2,636,138 | Few et al. | Apr. 21, 1953 |
| 2,652,770 | Wilkins | Sept. 22, 1953 |
| 2,886,155 | Hadley | May 12, 1959 |
| 2,912,606 | Fehn | Nov. 10, 1959 |
| 2,941,137 | Fehn | June 14, 1960 |